(12) United States Patent
Osoinach et al.

(10) Patent No.: US 8,558,802 B2
(45) Date of Patent: Oct. 15, 2013

(54) METHODS AND APPARATUS FOR PERFORMING CAPACITIVE TOUCH SENSING AND PROXIMITY DETECTION

(75) Inventors: Bryce T. Osoinach, Phoenix, AZ (US); Simon Mejia, Tolleson, AZ (US); Craig R. Teegarden, Pittsburgh, PA (US)

(73) Assignee: Freescale Semiconductor, Inc., Austin, TX (US)

( * ) Notice: Subject to any disclaimer, the term of this patent is extended or adjusted under 35 U.S.C. 154(b) by 836 days.

(21) Appl. No.: 12/592,290

(22) Filed: Nov. 21, 2009

(65) Prior Publication Data

US 2011/0120784 A1    May 26, 2011

(51) Int. Cl.
| G06F 3/041 | (2006.01) |
| G06F 3/045 | (2006.01) |
| G06F 3/044 | (2006.01) |
| G09G 5/00 | (2006.01) |

(52) U.S. Cl.
USPC ......... 345/173; 345/156; 345/174; 178/18.06

(58) Field of Classification Search
USPC ............... 345/156–158, 173–174; 178/18.03, 178/18.06, 19.01, 19.03
See application file for complete search history.

(56) References Cited

U.S. PATENT DOCUMENTS

| 4,345,167 | A | 8/1982 | Calvin |
| 6,937,951 | B2 | 8/2005 | Gibb et al. |
| 7,076,381 | B2 | 7/2006 | Gibb et al. |
| 7,119,554 | B2 | 10/2006 | Nakamura et al. |
| 7,138,809 | B2 | 11/2006 | Nakamura et al. |
| 7,583,092 | B2 | 9/2009 | Reynolds et al. |
| 7,705,611 | B2 | 4/2010 | Ogata et al. |
| 7,821,274 | B2 | 10/2010 | Philipp et al. |
| 7,876,105 | B2 | 1/2011 | Ogata et al. |
| 2007/0074913 | A1* | 4/2007 | Geaghan et al. ........... 178/18.06 |
| 2007/0074914 | A1* | 4/2007 | Geaghan et al. ........... 178/18.06 |
| 2007/0109274 | A1 | 5/2007 | Reynolds |
| 2007/0222766 | A1 | 9/2007 | Bolender |
| 2007/0257890 | A1 | 11/2007 | Hotelling et al. |
| 2008/0018608 | A1 | 1/2008 | Serban et al. |
| 2008/0018611 | A1 | 1/2008 | Serban et al. |
| 2008/0158168 | A1* | 7/2008 | Westerman et al. .......... 345/173 |
| 2008/0231603 | A1* | 9/2008 | Parkinson et al. ............ 345/173 |
| 2008/0246723 | A1* | 10/2008 | Baumbach .................... 345/156 |
| 2009/0244019 | A1* | 10/2009 | Choi ............................. 345/173 |
| 2010/0033449 | A1* | 2/2010 | Chiu et al. .................... 345/174 |
| 2010/0107770 | A1 | 5/2010 | Serban et al. |

OTHER PUBLICATIONS

PCT/US2010/055263 International Search Report and Written Opinion mailed Jul. 29, 2011.

* cited by examiner

*Primary Examiner* — Jonathan Horner
(74) *Attorney, Agent, or Firm* — Sherry W. Schumm

(57) ABSTRACT

Embodiments include methods and apparatus for performing capacitive touch sensing and proximity detection. Electrode selection circuitry establishes a first connection with an individual electrode of a plurality of individual electrodes in order to receive one or more first signals indicating a state of the individual electrode, and establishes second connections with a proximity electrode that comprises multiple ones of the plurality of individual electrodes in order to receive one or more second signals indicating a state of the proximity electrode. A processing system performs a first analysis on the first signals to determine whether to perform a first updating process for an individual electrode baseline value, and performs a second analysis on the second signals to determine whether to perform a second updating process for a proximity electrode baseline value. In an embodiment, the first analysis and the second analysis are different from each other.

20 Claims, 9 Drawing Sheets

METHODS AND APPARATUS FOR PERFORMING CAPACITIVE TOUCH SENSING AND PROXIMITY DETECTION

TECHNICAL FIELD

Embodiments relate to capacitive touch sensor devices, and more particularly to methods and apparatus for configuring capacitive touch sensor devices that include a proximity detection feature.

BACKGROUND

Capacitive touch sensor devices have been incorporated into a variety of consumer electronics, including cellular telephones, computers, portable entertainment devices, appliances, and touch screens, to name a few. At a minimum, a capacitive touch sensor device includes one or more touch sensors (or "electrodes"), each of which is configured to indicate a capacitance change when the sensor is touched (e.g., by a stylus or a user's finger). Each sensor may be associated with a distinct user input, and the detection of a touch by a particular sensor may initiate a responsive process in the device. For example, to enable a user to make a telephone call, a cellular telephone with a relatively simple user interface may include an array of twelve sensors, with ten of the sensors being associated with each of the numbers from 0 to 9, an eleventh sensor being associated with a "SEND" key, and a twelfth sensor being associated with an "END" key. Each time the user touches a sensor associated with a number, the device displays the number and stores it in a register. When the register includes a set of numbers associated with a remote device (e.g., a telephone number), and the user touches a sensor associated with the "SEND" key, the device may initiate a connection with a communication network (e.g., a cellular telephone network). The device additionally may send to the network the set of numbers in the register, thus enabling the network to initiate a communication session with the remote device.

Some capacitive touch sensor devices also include a "proximity sensor" (or "proximity electrode"), which is distinct from the touch sensors, and which is configured to detect the approach or proximity of an object (e.g., a stylus or a user's finger) by sensing changes in capacitance, as opposed to detecting an actual touch. An indication by a proximity sensor that an object is approaching also may initiate a responsive process in the device. For example, when a proximity sensor indicates that an object is approaching, the device may cause a backlight to activate, thus illuminating a display screen. Such a feature may enable the device to conserve power, among other things, and proximity sensors have been used to initiate a variety of processes. A proximity sensor typically includes a relatively large, stand-alone electrode. Because of their size, proximity sensors typically are not included in devices that have crowded touch sensor arrays and/or severe size constraints.

DETAILED DESCRIPTION

Embodiments include methods and apparatus by which proximity detection may be incorporated into a device, even when characteristics of the device do not lend themselves to the inclusion of relatively large, proximity sensors. A particular embodiment includes creating a "pseudo" or "proximity" electrode as a combination of a plurality of individual electrodes, where the proximity electrode functions to provide proximity detection. In addition, embodiments include methods and apparatus for filtering sensor data from the individual electrodes differently from filtering sensor data from the proximity electrode, as the characteristics of touch sensing and proximity sensing may have different frequency characteristics. The various embodiments enable a proximity detection feature to be easily incorporated into a wide variety of device types, including devices that have crowded touch sensor arrays and/or severe size constraints (e.g., cellular telephones and other portable devices).

Figure 1:
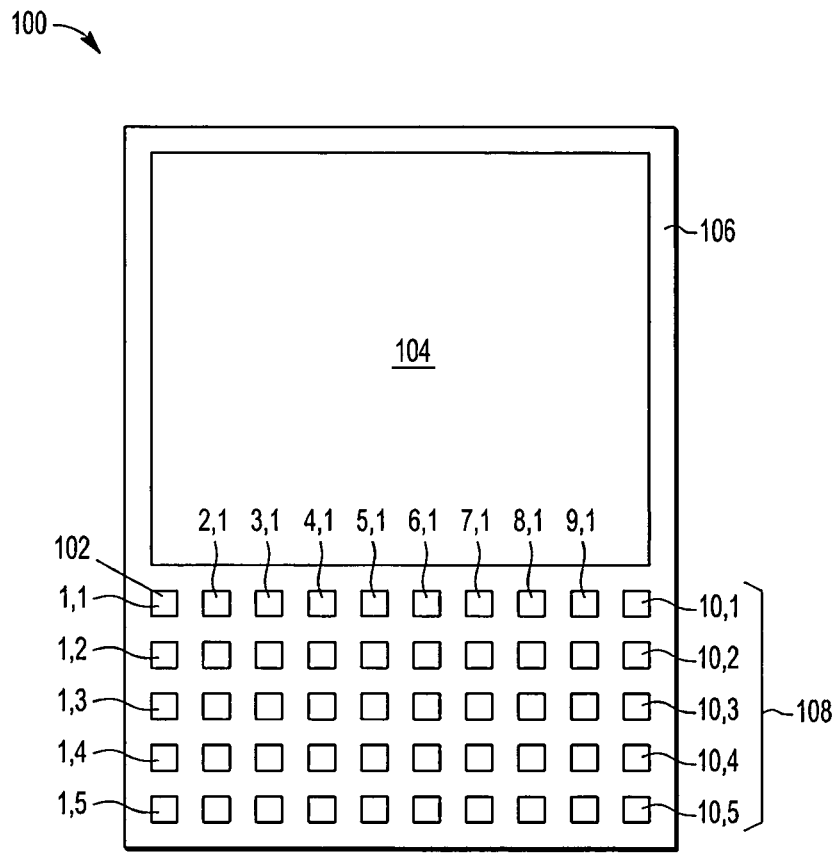
FIG. 1 illustrates a plan view of a example electronic device, according to an example embodiment.

FIG. 1 illustrates a plan view of a example electronic device 100 that includes, on an input face 106 of the device 100, multiple, individual touch sensor electrodes 102 ("electrodes") and a display 104, according to an example embodiment. Electrodes 102 are arranged in an array 108 having "X" columns and "Y" rows. For purposes of example only, array 108 includes ten columns and five rows of electrodes 102. The designation "i,j" may be used throughout this description to refer to a particular electrode of an array (e.g., array 108), where "i" indicates a column number, and "j" indicates a row number. Accordingly, for example, each electrode of array 108 can be identified by a value from 1,1 . . . i,j . . . X,Y. Although device 100 is shown to include fifty electrodes 102 in an array 108 of ten columns and five rows, it is to be understood that a device may include more or fewer electrodes, which may be arranged in an array of more or fewer columns and/or rows, and/or which may be arranged in a configuration other than an array, in other embodiments. In addition, the electrodes may include free standing electrodes, such as are shown in FIG. 1, and/or the electrodes may be incorporated in a display screen in the form of virtual electrodes.

The device configuration illustrated in FIG. 1 may correspond, for example, to a cellular telephone or micro-computer. It is to be understood that the configuration of FIG. 1 is provided for example purposes only, and that embodiments may be incorporated into any type of device intended to receive user inputs via contact with and/or proximity to an electrode by an "activation element." As used herein, the term "activation element" is intended to be interpreted broadly and include any object by which a user interacts with electrodes (e.g., a finger, an ear, a cheek, a hand, a stylus or various other instruments adapted for approaching or touching one or more electrodes). For convenience of explanation and not intended to be limiting, it is assumed in the discussion that follows that electric field sensing is used to determine whether a particular electrode is being approached or contacted by an activation element. However, persons of skill in the art will understand, based on the description herein, that other types of proximity and/or contact sensing may also be employed. Non-limiting examples of useful alternative sensing techniques include optical sensing, magnetic field sensing, and combinations of optical, electric, and/or magnetic field sensing.

In many cases, the electrodes associated with a capacitive touch sensor may be designed to be very small, in order to facilitate inclusion of many electrodes on an input face of a device. This is particularly true for hand-held devices that include a large number of input electrodes. Common examples are devices incorporating a "qwerty" keyboard, a 10 to 12-key number and/or symbol pad, and other multifunction sensor arrays. An array of sensors may consume a large quantity of the available space on an input face of a device, and a display screen and other components (e.g., a speaker and/or microphone) may consume much of the remaining available space. Device 100 of FIG. 1 illustrates this situation, where the combination of display 104 and sensor array 108 consumes nearly all of the space available on input face 106. A problem with this situation is that there is no space left on input face 106 for a large area electrode or sensing element to be used for proximity detection. The various embodiments described herein overcome this limitation by dynamically combining individual electrodes into a "pseudo electrode" or "proximity electrode" for general proximity sensing purposes, and then automatically returning the electrodes of the combination to an individual sensing status. It should be noted that even though a device may have sufficient unused space on its input surface to accommodate a relatively large area, general proximity detection electrode, this can add undesirable additional manufacturing cost. Thus, the various embodiments described herein for achieving an electrical equivalent of a large area proximity detection electrode may be useful even for a device that has sufficient space to accommodate a large area proximity detection element.

Figure 2:
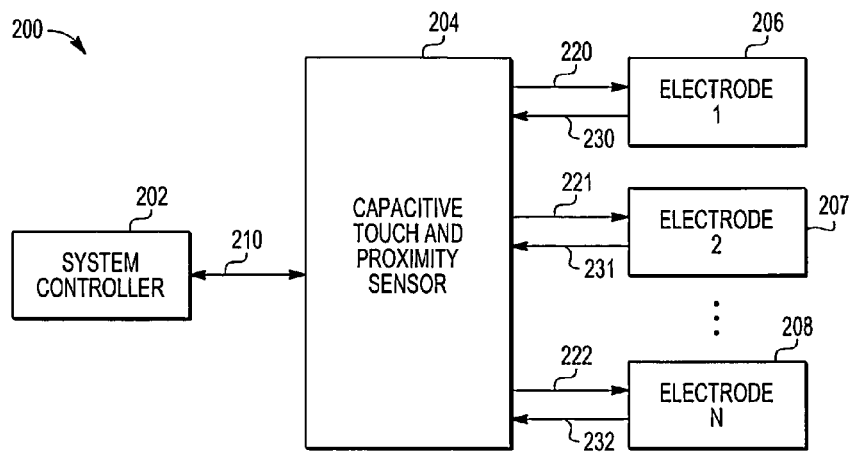
FIG. 2 illustrates a simplified schematic block diagram of a portion of an electronic system within which a capacitive touch and proximity sensor system is incorporated, according to an example embodiment.

FIG. 2 illustrates a simplified block diagram of a portion of an electronic system 200 within which a capacitive touch and proximity sensor system is incorporated, according to an example embodiment. The portion of the system 200 may be incorporated within a cellular telephone, a radio, a computer, a portable entertainment device, a personal digital assistant (PDA), an electronic game, a remote control device, a control console, an appliance, a touch screen, or any of various other types of electronic devices. According to an embodiment, the system 200 includes a system controller 202, a capacitive touch and proximity sensor system 204, and from one to N touch pad electrodes 206, 207, 208, where N is an integer (e.g., an integer in a range from 1 to hundreds). As mentioned previously in conjunction with FIG. 1, electrodes 206-208 may be arranged in an array (e.g., array 108, FIG. 1), although electrodes 206-208 may be arranged in a different configuration, as well.

Each touch pad electrode 206-208 is arranged in physical proximity to a dielectric touch plate (or a portion thereof). Each electrode 206-208 and its associated dielectric touch plate function as one electrode and a dielectric of a capacitor, respectively. When a user touches a portion of a dielectric touch plate associated with a sensor location (e.g., directly above an electrode 206-208), a potential variation in the electrode 206-208 is produced due to a capacitive circuit formed between ground potential (e.g., the Earth), the user, and the electrode 206-208. Through an electrode charging and voltage measurement process, the capacitive touch and proximity sensor system 204 may periodically and frequently determine whether the capacitance associated with an electrode 206-208 has changed sufficiently to indicate whether a "touch event" or a "release event" has occurred. More particularly, in order to measure the capacitance, a charging circuit charges an electrode (e.g., electrode 206) by providing the electrode 206 with a pre-determined current for a pre-determined time. At the culmination of the charging process, a touch determination circuit measures the voltage between the electrode 206 and ground (or some other fixed potential). When the measured voltage falls sufficiently below a baseline value associated with a no-touch condition (e.g., below a touch detection threshold), the touch determination circuit may indicate that a touch has been sensed. The charging and measurement procedures continue to be repeated, and when the measured voltage later rises toward the baseline value by a sufficient amount (e.g., above a release detection threshold), the touch determination circuit may then indicate that a release has been sensed.

According to an embodiment, system 200 also includes a proximity detection feature. As will be explained in more detail below, the proximity detection feature is implemented by selectively combining a plurality of electrodes 206-208 to form a proximity electrode having an area that is effectively larger than the areas of the individual electrodes 206-208 in isolation. Again, through a charging and voltage measurement process of the electrodes 206-208 that form the proximity electrode, the capacitive touch and proximity sensor system 204 may periodically and frequently determine whether the capacitance associated with the proximity electrode has changed sufficiently to indicate whether an "approach event" or a "retreat event" has occurred. The charging and measurement process may be similar to that for an individual electrode, although it is performed in parallel for all of the electrodes of the proximity electrode. According to an embodiment, however, the pre-determined charging current and the pre-determined charging time for the proximity electrode charging process may be differently configured from the pre-determined charging current and the pre-determined charging time for the individual electrode charging process. In addition or alternately, the characteristics of the analysis (e.g., the filtering process) used to determine whether an activation element is proximate the proximity electrode may be different from the characteristics of the analysis (e.g., the filtering process) used to determine whether a touch has occurred, according to an embodiment. These features of the various embodiments will be discussed in more detail below.

Capacitive touch and proximity sensor system 204 may be implemented using one or more integrated circuit chips and/or discreet components that are interconnected to provide the below-described functionalities. Capacitive touch and proximity sensor system 204 is operatively coupled with each electrode 206-208 through charging lines 220, 221, 222 and measurement lines 230, 231, 232. Although charging lines 220-222 and measurement lines 230-232 are shown to be distinct lines in FIG. 2, it is to be understood that the charging and measurement processes may be performed for an electrode over a single line (e.g., charging line 220 and measurement line 230 are the same line). In other words, the charging and measurement processes may be performed for an electrode using two pins or a single pin of capacitive touch and proximity sensor system 204, according to various embodiments.

According to an embodiment, capacitive touch and proximity sensor system 204 is configured to store charge configuration information for each electrode 206-208, where the charge configuration information includes at least a baseline voltage, a charging current, and a charging interval for each electrode 206-208. In addition, capacitive touch and proximity sensor system 204 is configured to store charge configuration information for a proximity electrode that is formed from a plurality of electrodes 206-208. The charge configuration information for the individual electrodes 206-208 and/or the proximity electrode may be set during a factory calibration procedure and/or by a customer, for example. According to an embodiment, the charge configuration information may be dynamically adjusted during the useful life of device 200 (e.g., to ensure that a charging voltage falls within a central range of measurable voltages or within a portion of the central range), or the charge configuration information may be fixed.

Using electrode 206 as an example, in order to charge electrode 206, capacitive touch and proximity sensor system 204 supplies a current over charge line 220, where the supplied current has a magnitude equal to the stored charging current for electrode 206. The charging current is supplied for the stored charging interval for electrode 206, and then the charging process is terminated. Capacitive touch and proximity sensor system 204 then measures the voltage of the electrode 206 over measurement line 230. In order to charge a proximity electrode formed from a plurality of electrodes 206-208, capacitive touch and proximity sensor system 204 supplies currents over a plurality of charge lines 220-222 (i.e., the charge lines 220-222 associated with the electrodes 206-208 of the proximity electrode), where the supplied current have a magnitude equal to the stored charging current for the proximity electrode. The charging current is supplied for the stored charging interval for the proximity electrode, and then the charging process is terminated. The voltage of the combined proximity electrode is then measured over a plurality of measurement lines 230 (i.e., the measurement lines 230-232 associated with the electrodes 206-208 of the proximity electrode).

According to an embodiment, capacitive touch and proximity sensor system 204 is also configured to store first analysis parameters (e.g., first filtering parameters) that are used during a first analysis (e.g., a first filtering process) performed using the individual electrode measurements, and to store second analysis parameters (e.g., second filtering parameters) that are used during a second analysis (e.g., a second filtering process) performed using the proximity electrode measurements. Essentially, the analysis of the individual electrode measurements results in values, which capacitive touch and proximity sensor system 204 compares with a stored baseline voltage for the individual electrode 206. When the difference between a value and the stored baseline voltage does not exceed a touch detection delta, the capacitive touch and proximity sensor system 204 may make a determination that electrode 206 is in a "no-touch state". Conversely, when the difference between a value and the baseline voltage exceeds the touch detection delta, the capacitive touch and proximity sensor system 204 may make a determination that a touch event has occurred, and thus that electrode 206 is in a "touch state". While in the touch state, the capacitive touch and proximity sensor system 204 may continue to repeat the charging and measuring process until a comparison between the determined values and the baseline voltage for the individual electrode 206 yields a difference that is less than a release detection delta. At that time, the capacitive touch and proximity sensor system 204 may determine that a release event has occurred, and thus that electrode 206 is again in the no-touch state.

Similarly, the analysis (e.g., the filtering process) performed using the proximity electrode measurements results in another value, which capacitive touch and proximity sensor system 204 compares with a stored baseline voltage for the proximity electrode (i.e., a different baseline voltage that the baseline voltage for the individual electrode). When the difference between the value and the stored baseline voltage does not exceed an approach detection delta, the capacitive touch and proximity sensor system 204 may make a determination that electrode 206 is in a "non-proximal state". Conversely, when the difference between the value and the baseline voltage exceeds the approach detection delta, the capacitive touch and proximity sensor system 204 may make a determination that an approach event has occurred, and thus that electrode 206 is in a "proximal state". While in the proximal state, the capacitive touch and proximity sensor system 204 may continue to repeat the charging and measuring process until a comparison between the determined value and the baseline voltage for the proximity electrode yields a difference that is less than a retreat detection delta. At that time, the capacitive touch and proximity sensor system 204 may determine that a retreat event has occurred, and thus that proximity electrode is again in the non-proximal state.

Capacitive touch and proximity sensor system 204 is operatively coupled with system controller 202. System controller 202 may include a special purpose or general purpose microprocessor, a digital signal processor, an Application Specific Integrated Circuit (ASIC), or some other type of processing component. System controller 202 and capacitive touch and proximity sensor system 204 may communicate over communication interface 210. According to an embodiment, the communication interface 210 may include one or more interrupt lines and one or more communication lines. For example, communication interface 210 may include transmission means to support an I$^2$C (Inter-Integrated Circuit) communication protocol, in an embodiment. In other embodiments, communication interface 210 may include transmission means to support an SPI (Serial Peripheral Interface) protocol, a UART (Universal Asynchronous Receiver/Transmitter) protocol, or some other type of inter-processor communication protocol.

Various types of interrupts, control signals, and data may be transferred over communication interface 210. For example, system controller 202 may provide control signals over communication interface 210, which are adapted to activate or deactivate (e.g., enable or disable) capacitive touch and proximity sensor system 204. In addition, when capacitive touch and proximity sensor system 204 detects a touch event, a release event, an approach event or a retreat event, capacitive touch and proximity sensor system 204 may provide an interrupt over communication interface 210. In response to the interrupt, system controller 202 may provide a request for information regarding the interrupt (e.g., a request to read a register of capacitive touch and proximity sensor system 204 that describes the triggering event for the interrupt). Capacitive touch and proximity sensor system 204 may then return data which indicates, for example, an electrode identity (e.g., an individual electrode or the proximity electrode) and an indicator of a touch event, a release event, an approach event or a retreat event. System controller 202 may then take whatever action is appropriate, given the circumstances.

Figure 3:
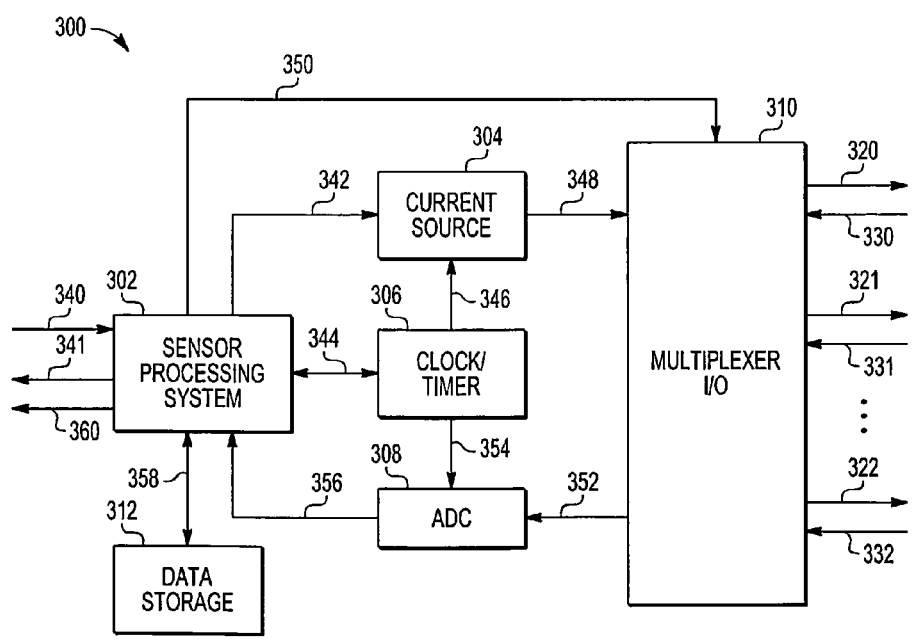
FIG. 3 illustrates a simplified schematic block diagram of a capacitive touch and proximity sensor system, according to an example embodiment.

More detail regarding various embodiments of capacitive touch and proximity sensor systems and configuration methods and apparatus will now be described. FIG. 3 illustrates a simplified block diagram of a capacitive touch and proximity sensor system 300 (e.g., capacitive touch and proximity sensor system 204, FIG. 2), according to an example embodiment. Capacitive touch and proximity sensor system 300 includes a sensor processing system 302, a current source 304, a clock/timer 306, an analog-to-digital converter (ADC) 308, a multiplexer input/output (I/O) 310, and data storage 312, according to an embodiment. These components may be incorporated into a single integrated circuit, or some or all of the components may be implemented as separate devices.

Sensor processing system 302 is configured to communicate with an external controller (e.g., system controller 202, FIG. 2) through one or more communication lines 340, 341 and one or more interrupt lines 360. According to an embodiment, and in response to receiving a control signal over communication line 340, sensor processing system 302 may initiate the process of monitoring one or more external electrodes (e.g., electrodes 106-108, FIG. 1) to determine whether voltages present on the electrodes exhibit properties indicating a no-touch state, a touch state, a touch event, a release event, a non-proximal state, a proximal state, an approach event or a retreat event. In addition, upon detection of a touch event, a release event, an approach event or a retreat event, sensor processing system 302 may store, via lines 358, information describing the event in data storage 312, and may send an interrupt to the system controller (e.g., system controller 202, FIG. 2) over an interrupt line 360. The information describing the event may include, for example, an electrode identity (e.g., an individual electrode or the proximity electrode) and the type of event (e.g., touch, release, approach or retreat). Alternatively, the information may include an electrode identity and the electrode's current state (e.g., touch state, no-touch state, proximal state or non-proximal state). In addition, sensor processing system 302 may store an indication of the newly entered state in data storage 312. For example, sensor processing system 302 may store an indication that the electrode is in a touch state when a touch event occurs, and sensor processing system 302 may store an indication that the electrode is in a no-touch state when a release event occurs.

According to an embodiment, sensor processing system 302 also may receive a control signal (e.g., over communication line 340 from system controller 202, FIG. 2), which indicates that the capacitive touch and proximity sensor system 204 should be activated or deactivated (e.g., enabled or disabled). The activation/deactivation control signal may be provided a single time (e.g., during factory setup of the device) or multiple times. Either way, sensor processing system 302 may store a proximity electrode enablement indicator (e.g., in data storage 312), which indicates whether the proximity electrode is enabled or disabled. In addition, sensor processing system 302 may store an indication that the proximity electrode is in a proximal state when an approach event occurs, and sensor processing system 302 may store an indication that the proximity electrode is in a non-proximal state when a retreat event occurs. Upon receiving a request for information regarding the interrupt over a communication line 340, sensor processing system 302 may retrieve the information from data storage 312, and may send a response over a communication line 341 that includes the event description. Sensor processing system 302 also may receive a control signal over communication line 340, which indicates that sensor processing system 302 should discontinue electrode monitoring (e.g., when the device is powering down), and sensor processing system 302 may discontinue electrode monitoring accordingly.

Data storage 312 may include one or more registers or other volatile storage adapted to store touch, release, approach, and retreat event information, electrode state information, analysis parameters (e.g., filtering parameters) for both the individual electrodes and the proximity electrode, charging parameters for both the individual electrodes and the proximity electrode, electrode-specific parameters, and a proximity electrode enablement indicator, each of which will be discussed in more detail below. The charging parameters may include, for example, a charging current, a charging interval, and a baseline value associated with a no-touch or non-proximal condition. In addition, data storage 312 may include a touch detection delta value, a release detection delta value, an approach detection delta value, and a retreat detection delta value. Alternatively, data storage 312 may include a touch detection threshold (e.g., the baseline value minus a touch detection delta), a release detection threshold (e.g., the baseline value minus a release detection delta), an approach detection threshold (e.g., the proximity electrode baseline value minus an approach detection delta), and a retreat detection threshold (e.g., the proximity electrode baseline value minus a retreat detection delta). "Configuring" the sensor 300 refers to the process of storing (or "establishing") some or all of the values, parameters, and/or information described in this paragraph in data storage 312 or elsewhere. The use of each of these values, parameters, and/or information will be discussed in more detail below.

Upon initiation of the electrode monitoring process (e.g., in response to a control signal received over a communication line 340), sensor processing system 302 may select a first electrode (e.g., electrode 206, FIG. 2) for monitoring by providing a select signal over multiplexer control line 350 to multiplexer I/O 310. The select signal indicates that multiplexer I/O 310 should enable a connection between current source 348 and the selected electrode for purposes of charging. Sensor processing system 302 may retrieve the charging parameters for the selected electrode from data storage 312, and may provide a control signal to current source 304 over control line 342, which indicates the charging current. In addition, sensor processing system 302 may provide a clock/timer control signal over control line 344 to clock/timer 306, which indicates the charging interval for the selected electrode. Clock/timer 306 may thereafter provide an enable signal to current source 304 over control line 346, which causes current source 304 to produce a current at the charging current on current output line 348. Upon expiration of the charging interval, clock/timer 306 may provide a disable signal to current source 304 over control line 346, which causes current source 304 to cease providing current on current output line 348. The current provided on current output line 348 is provided to the selected electrode on one of charging lines 320, 321, 322.

When the proximity electrode is enabled, monitoring the proximity electrode may be performed in sequence with monitoring the individual electrodes. According to an embodiment, in order to monitor the proximity electrode, sensor processing system 302 may select the proximity electrode for monitoring by providing a select signal over multiplexer control line 350 to multiplexer I/O 310, where the select signal indicates that multiplexer I/O 310 should enable connections between current source 348 and multiple electrodes (up to all of the electrodes) for purposes of charging. Sensor processing system 302 may retrieve the charging parameters for the proximity electrode from data storage 312, and may provide a control signal to current source 304 over control line 342, which indicates the charging current. According to an embodiment, the charging current for the proximity electrode may be different from the charging current for the individual electrodes. In addition, sensor processing system 302 may provide a clock/timer control signal over control line 344 to clock/timer 306, which indicates the charging interval for the proximity electrode. Again, according to an embodiment, the charging interval for the proximity electrode may be different from the charging interval for the individual electrodes. Clock/timer 306 may thereafter provide an enable signal to current source 304 over control line 346, which causes current source 304 to produce a current at the charging current on current output line 348. Upon expiration of the charging interval, clock/timer 306 may provide a disable signal to current source 304 over control line 346, which causes current source 304 to cease providing current on current output line 348. The current provided on current output line 348 is provided to the electrodes associated with the proximity electrode on a plurality of charging lines 320, 321, 322.

When provision of the current is terminated (e.g., at the end of the charging interval), the capacitive touch sensor may measure the voltage of the electrode. Sensor processing system 302 may perform a voltage measurement for the selected electrode or the proximity electrode by providing another control signal to multiplexer I/O 310 over multiplexer control line 350, which enables multiplexer I/O 310 to access an analog voltage signal for the selected electrode (or electrodes, in the case of the proximity electrode) over one or more of measurement lines 330, 331, 332. The select signal causes multiplexer I/O 310 to enable connections between the selected electrode (or multiple electrodes, in the case of the proximity electrode) and ADC 308 for purposes of sensing. As discussed previously, although charging lines 320-322 and measurement lines 330-332 are shown to be distinct lines in FIG. 3, it is to be understood that the charging and measurement processes may be performed for an electrode over a single line (e.g., charging line 320 and measurement line 330 may be the same line).

Multiplexer I/O 310 provides an analog voltage signal to ADC 308 over analog voltage line 352. In response to a clock signal provided by clock timer 306 over control line 354, ADC 308 converts the received analog voltage signal to a digital value, which may be represented as an ADC count, according to an embodiment. In other words, ADC 308 samples the analog voltage signal in order to produce a plurality of digital values. ADC 308 then provides the sampled, digital values to sensor processing system 302 over digital voltage line 356. The electrode (or electrodes) may then be discharged to zero volts during a discharge interval, and the process may be repeated one or more times in order to obtain one or more additional voltage measurements for the same selected electrode or for the proximity electrode. As will be described in more detail in conjunction with FIG. 8, for example, sensor processing system 302 may cause the charging and voltage measurement processes to be repeated one or more times for the selected electrode or the proximity electrode, and may then evaluate the measured voltages to determine, for example, whether a touch event, a release event, an approach event or a retreat event has occurred. As used herein, a measured "electrode voltage," "electrode voltage value" or "EVV" may generically refer to a single measured electrode voltage value or a mathematically derived electrode voltage value based on a plurality of electrode voltage value measurements.

Upon receiving information from ADC 308 regarding an electrode voltage value for a selected electrode (e.g., electrode 206, FIG. 2), sensor processing system 302 may then select another electrode (e.g., electrode 207, FIG. 2) through a control signal to multiplexer I/O 310, and may repeat the charging and measurement process for the next selected electrode. This process may be performed for all remaining electrodes (e.g., through electrode 208, FIG. 2), thus completing a first iteration of monitoring the electrode voltages. At the end of the iteration of monitoring the electrode voltages for each individual electrode, sensor processing system 302 may select the proximity electrode (i.e., a combination of multiple ones of electrodes 206-208, FIG. 2) through a control signal to multiplexer I/O 310, and may repeat the charging and measurement process for the proximity electrode, according to an embodiment. Additional iterations of charging and monitoring the system's electrodes may thereafter be performed, beginning again with the first selected electrode (e.g., electrode 206, FIG. 2). According to other embodiments, the monitoring process for the proximity electrode may be performed at the beginning or somewhere in the middle of an iteration of monitoring the individual electrodes, or the proximity electrode monitoring process may be repeated multiple times within an iteration of monitoring the individual electrodes.

As mentioned previously, capacitive touch sensor 300 is adapted to perform automatic configuration and/or reconfiguration processes, according to an embodiment. The automatic configuration process includes initially determining and storing a baseline value, a charging current, and a charging interval for each electrode (referred to herein as a "stored baseline value," a "stored charging current," and a "stored charging interval," respectively), and storing a baseline value, a charging current, and a charging interval for the proximity electrode (referred to herein as a "stored proximity baseline value," a "stored proximity charging current," and a "stored proximity charging interval," respectively). The automatic reconfiguration process includes updating (e.g., determining and storing) the stored baseline value, the stored charging current, and the stored charging interval for each electrode, as well as the stored proximity baseline value, the stored proximity charging current, and the stored proximity charging interval for the proximity electrode. An automatic configuration process or an automatic reconfiguration process may be referred to simply as a "configuration process," herein. The automatic configuration process may be performed in conjunction with the charging and measurement procedures performed for each electrode. Methods and apparatus for configuring and automatically reconfiguring the system and updating the various parameters will be discussed in more detail in conjunction with FIGS. 6 and 7.

As discussed briefly above, the capacitive touch sensor 300 may evaluate measured voltages to determine whether a touch event, a release event, an approach event or a retreat event has occurred. According to an embodiment, when an electrode is in a no-touch state, determining whether a touch event has occurred includes determining whether the measured voltage is above or below a touch detection threshold. Conversely, when the electrode is in a touch state, determining whether a release event has occurred includes determining whether the measured voltage is above or below a release detection threshold. Similarly, when the proximity electrode is in a non-proximal state, determining whether an approach event has occurred includes determining whether the measured voltage is above or below an approach detection threshold. Conversely, when the proximity electrode is in a proximal state, determining whether a retreat event has occurred includes determining whether the measured voltage is above or below a retreat detection threshold.

Figure 4:
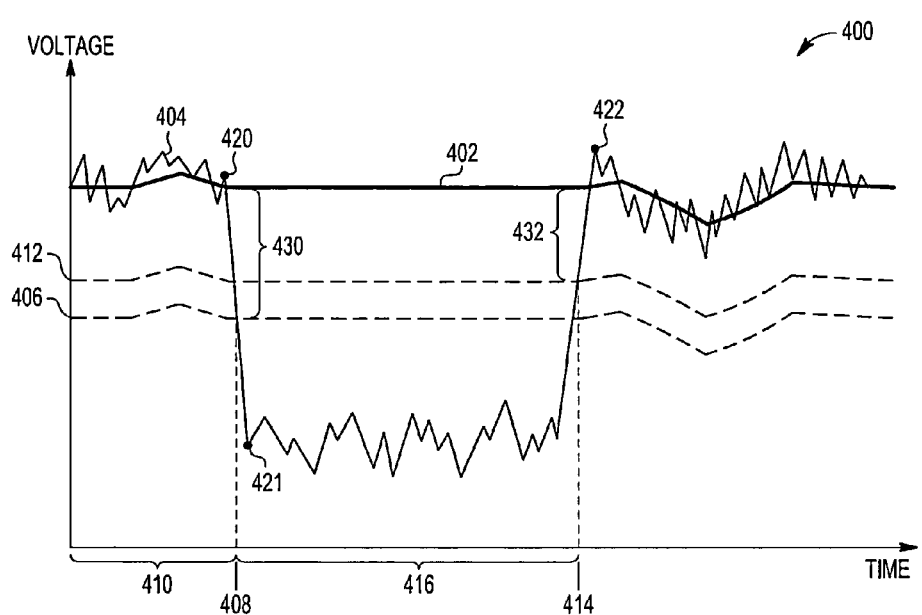
FIG. 4 is a chart illustrating example electrode voltage measurements plotted in conjunction with a sensing baseline and detection thresholds, according to an example embodiment.

FIG. 4 is provided in conjunction with describing the baseline value, the touch or approach detection threshold, and the release or retreat detection threshold. Although the same figure is used to describe touch and release detection for an individual electrode and approach and retreat detection for a proximity electrode, it is to be understood that the detection events for the individual electrodes and the proximity electrodes may have significantly different characteristics. However, for purposes of brevity, a single figure is used to depict the detection events for both the individual electrodes and the proximity electrode.

More particularly, FIG. 4 is a chart 400 illustrating example voltage measurements 420, 421, 422 plotted in conjunction with a baseline 402, touch or approach detection thresholds 406 (referred to as a "first detection threshold"), and an approach or retreat detection threshold 412 (referred to as a "second detection threshold") for a single electrode or for a proximity electrode, according to an example embodiment. Although only three discrete electrode voltage measurements 420-422 are indicated in FIG. 4, the voltage measurement signal 404 represents a plurality of measurement points, which are shown to be connected together as a continuous voltage measurement signal 404 for clarity of description. Similarly, although the baseline 402 is illustrated as a continuous signal for clarity of description, the baseline actually may be represented in the system by the stored baseline value. In various embodiments, each voltage measurement 420-422 may represent the result of a single measurement for a single charging and measurement cycle for the electrode (or the proximity electrode), or each voltage measurement 420-422 may represent a plurality of measurements for a plurality of charging and measurement cycles for the electrode (or the proximity electrode). Either way, the voltage measurements 420-422 may be different from measurement-to-measurement, as is depicted in FIG. 4.

Beginning from the left side of chart 400, a plurality of voltage measurements (including voltage measurement 420) are taken during a time interval 410 when a selected individual electrode is in a no-touch state or the proximity electrode is in a non-proximal state. An electrode may be considered to be in a no-touch state when voltage measurements for the electrode have values that are above a detection threshold 406 (e.g., a touch detection threshold), and the proximity electrode may be considered to be in a non-proximal state when voltage measurements for the proximity electrode have values that are above a detection threshold 406 (e.g., an approach detection threshold). According to an embodiment, at any given time, the touch detection threshold is equal to the stored baseline value minus a touch detection delta (e.g., delta 430), or the approach detection threshold is equal to the stored proximity baseline value minus an approach detection delta (e.g., delta 430). In an embodiment, the touch detection delta and the approach detection delta are fixed values, although the touch detection delta and/or the approach detection delta may be adjustable values, in another embodiment. FIG. 4 illustrates that voltage measurement 420 is above the first detection threshold 406, and accordingly a comparison of voltage measurement 420 with the first detection threshold 406 will indicate that the electrode is in the no-touch state or the non-proximal state.

According to an embodiment, the baseline for each individual electrode and for the proximity electrode (e.g., baseline 402) may be dynamically adjusted while the electrode is in the no-touch state or the non-proximal, as will be discussed in more detail later. Dynamic adjustment of baseline 402 is shown in FIG. 4 by the increasing and decreasing nature of baseline 402 during time interval 410. As baseline 402 is dynamically adjusted, the first detection threshold 406 and the second release threshold 412 also are dynamically adjusted, as depicted in FIG. 4.

Continuing across chart 400 toward the right, the voltage measurement signal 404 drops below the first detection threshold 406 at time 408. Accordingly, a comparison of voltage measurement 421 with the first detection threshold 406 will indicate that the electrode is now in the touch state or the proximal state. As will be described in more detail later, the system may generate an interrupt (e.g., on an interrupt line 360, FIG. 3) when a transition from a no-touch or non-proximal state to a touch or proximal state is detected. The electrode may be considered to remain in a touch or proximal state when voltage measurements for the electrode have values that are below a second detection threshold 412. According to an embodiment, at any given time, the second detection threshold 412 is equal to the stored baseline value minus a delta 432 (e.g., a release detection delta or a retreat detection delta).

As illustrated in FIG. 4, during time interval 416, the electrode remains in the touch or proximal state. Continuing once again across chart 400 toward the right, the voltage measurement signal 404 rises above the second detection threshold 412 at time 414. Accordingly, a comparison of voltage measurement 422 with the second detection threshold 412 will indicate that the electrode is once again in the no-touch state or a non-proximal state. The electrode may be considered to remain in the no-touch or non-proximal state when voltage measurements for the electrode have values that are above the second detection threshold 406.

In the depicted embodiment, the second detection threshold 412 is at a different voltage from the first detection threshold 406, which provides hysteresis in the system. More particularly, the second detection threshold 412 is at a higher voltage than the first detection threshold 406. In an alternate embodiment, the second threshold 412 may be at a lower voltage than the first detection threshold 406. In yet another alternate embodiment, the first detection threshold 406 and the second detection threshold 412 may be equal, in which case the system may maintain only one threshold for comparison purposes (for each electrode and for the proximity electrode). These various embodiments are intended to be included within the scope of the inventive subject matter.

Figure 5:
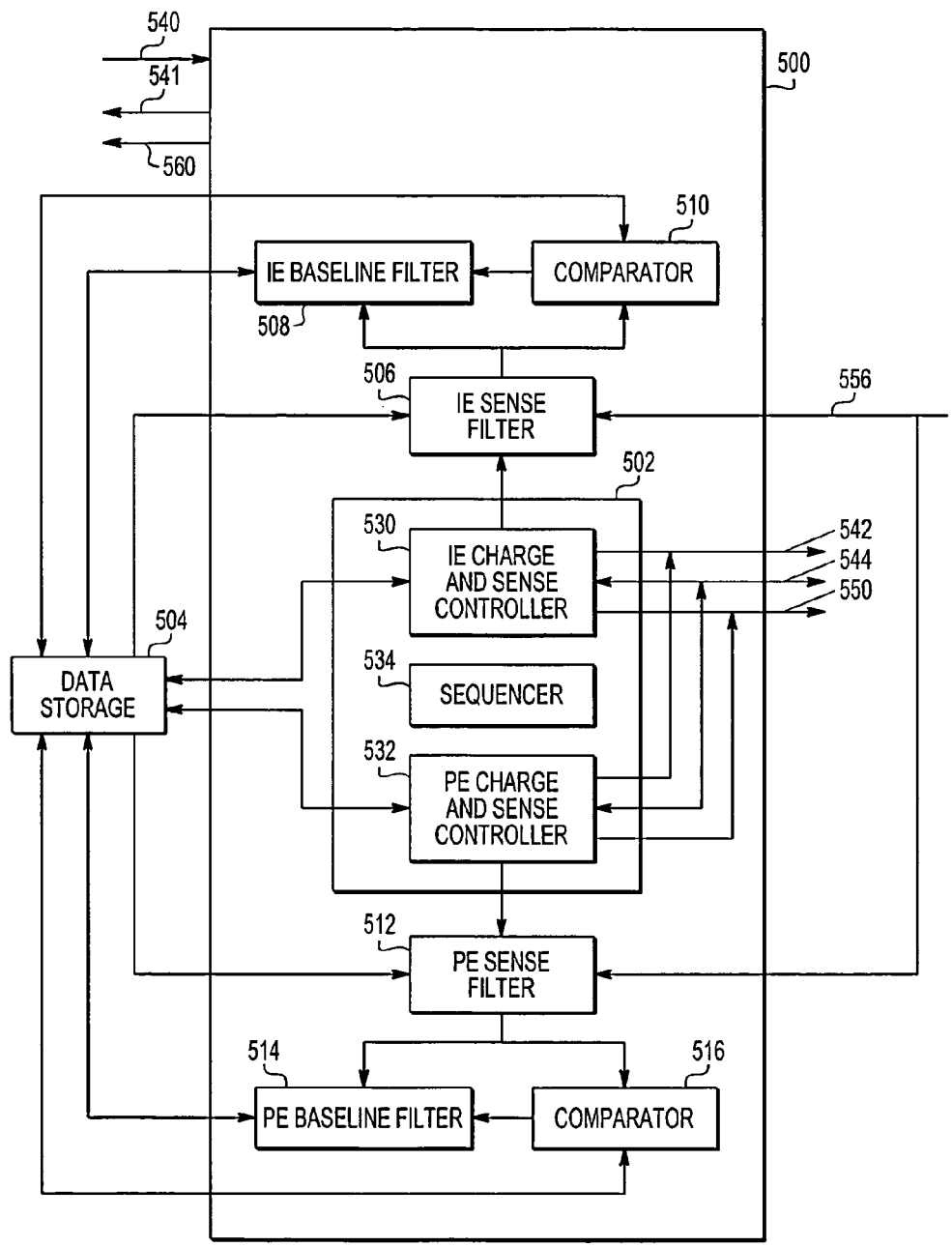
FIG. 5 illustrates a simplified schematic block diagram of a sensor processing system for a capacitive touch and proximity sensor system, according to an example embodiment.
Figure 6:
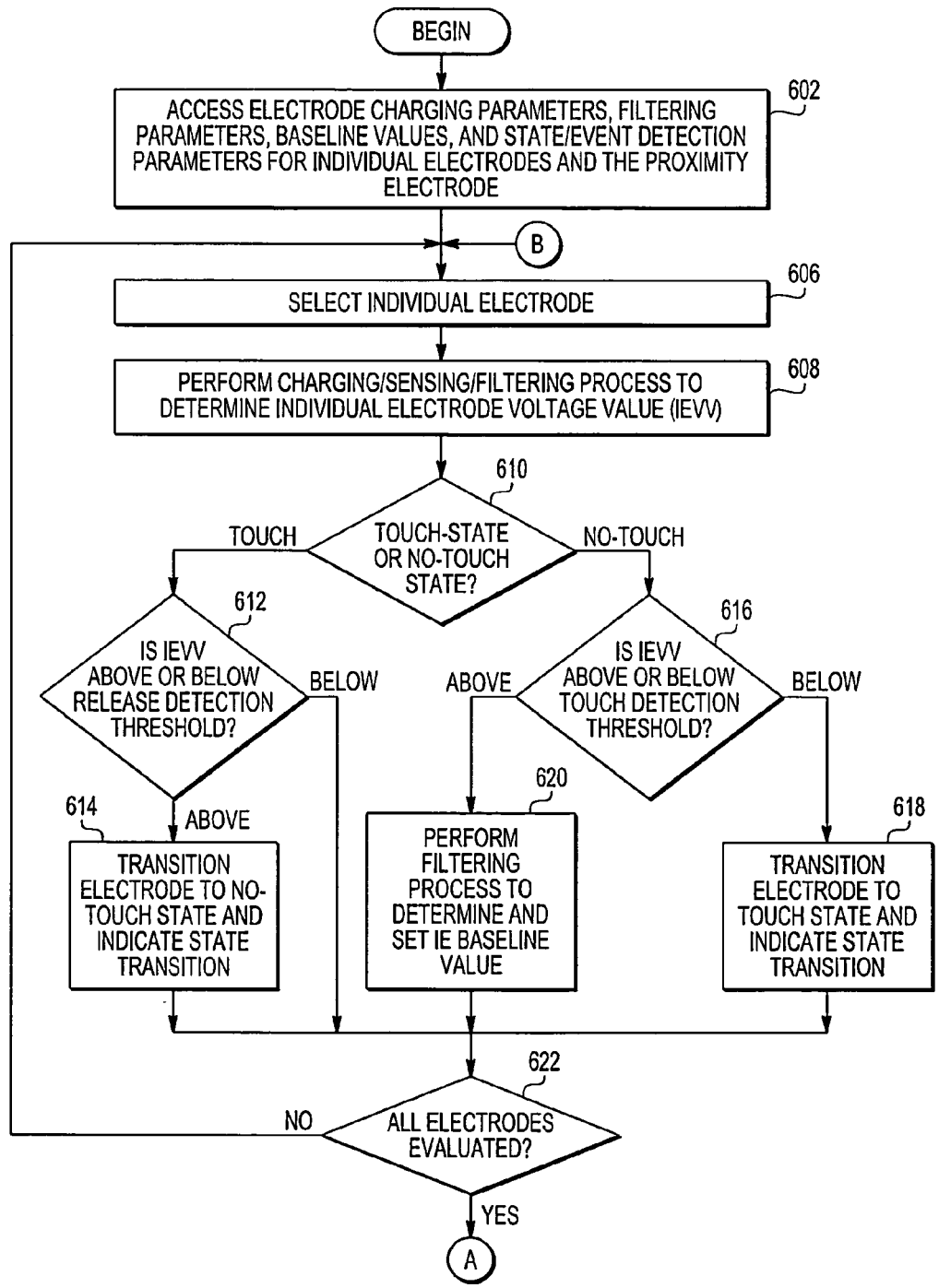
FIGS. 6 and 7 illustrate a flowchart of a method for performing touch/release detection, approach/retreat detection, touch baseline maintenance, and proximity baseline maintenance, according to an example embodiment.
Figure 7:
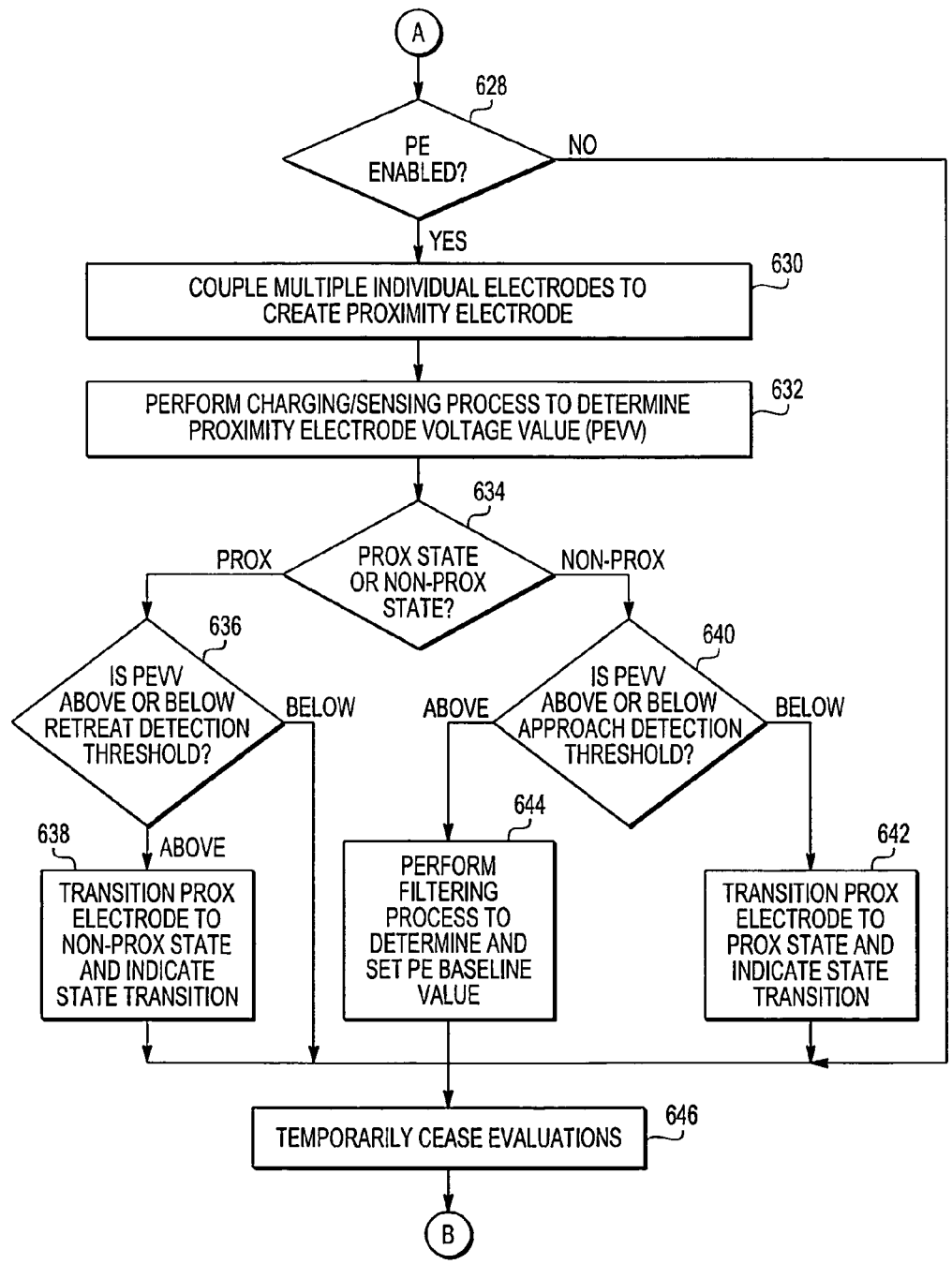

Now that the baseline values and the various thresholds have been described in more detail, a more detailed description of a sensor controller (e.g., sensor processing system 302, FIG. 3) and its operation will be given. This description will be made with reference to FIGS. 5-7, which should be viewed together for enhanced understanding. More particularly, FIG. 5 illustrates a simplified schematic block diagram of a sensor processing system 500 (e.g., sensor processing system 302, FIG. 3) for a capacitive touch and proximity sensor system (e.g., system 300, FIG. 3), according to an example embodiment, and FIGS. 6 and 7 illustrate a flowchart of a method for performing touch/release detection, proximity detection, touch baseline maintenance, and proximity baseline maintenance, according to an example embodiment. According to an embodiment, the entire method depicted in FIGS. 6 and 7 may be performed by a capacitive touch and proximity sensor system (e.g., capacitive touch and proximity sensor system 300, FIG. 3) that includes a sensor controller (e.g., sensor processing system 302, FIG. 3 or sensor processing system 500, FIG. 5) without assistance from any external processing entity (e.g., system controller 202, FIG. 2). In an alternate embodiment, portions of the method may be performed by an external processing entity.

Referring first to FIG. 5, sensor processing system 500 includes a charge and sense controller module 502, an individual electrode (IE) sense filter 506, an IE baseline filter 508, a first comparator 510, a proximity electrode (PE) sense filter 512, a PE baseline filter 514, and a second comparator 516, according to an embodiment. The charge and sense controller module 502, in turn, includes an IE charge and sense controller 530, a PE charge and sense controller 532, and a sequencer 534, according to an embodiment. For convenience of description, FIG. 5 also illustrates data storage 504, which may correspond, for example, to data storage 312, FIG. 3.

Referring now also to FIG. 6, a method for performing touch/release detection, approach/retreat detection, touch baseline maintenance, and proximity baseline maintenance may be initiated based on the receipt of a control signal on communication line 540 (e.g., a control signal on line 340, FIG. 3, from system controller 202, FIG. 2) by sensor processing system 500. Upon receipt of the control signal, the method may begin, in block 602, by accessing electrode charging parameters, analysis parameters (e.g., filtering parameters), baseline values, and state/event detection parameters for each individual electrode and for the proximity electrode, according to an embodiment. Electrode charging parameters, analysis parameters, initial baseline values, and state/event detection parameters may be determined and established (e.g., stored in a non-volatile type of data storage) during a factory calibration procedure and/or by a customer while integrating the capacitive touch and proximity sensor system (e.g., system 300) into a device (e.g., device 100 or 200, FIGS. 1 and 2). Sensor processing system 500 (or sensor processing system 302, FIG. 3) may retrieve the electrode charging parameters, analysis parameters, initial baseline values, and state/event detection parameters from non-volatile data storage, and store them in data storage 504 (or data storage 312) that is accessible to the sensor processing system 500.

Stored within data storage 504 and accessible to various elements of sensor processing system 500, the electrode charging parameters may include, for example, a charging current and a charging interval for each individual electrode and for the proximity electrode. The analysis parameters (e.g., filtering parameters), which will be discussed in greater detail in conjunction with FIG. 8 later, may include, for example, one or more noise count limit (NCL) values, maximum half delta (MHD) values, noise half delta (NHD) values, and filter delay limit (FDL) values for each individual electrode and for the proximity electrode. The initial baseline values may include baseline values for each individual electrode and for the proximity electrode. For each individual electrode, the state/event detection parameters may include a touch detection threshold and/or a touch detection delta, and a release detection threshold and/or a release detection delta. For the proximity electrode, the state/event detection parameters may include an approach detection threshold and/or an approach detection delta, and a retreat detection threshold and/or a release detection delta. Each of the above values may be stored within distinct registers or memory locations of data storage 504. In addition, data storage 504 may include registers or memory locations allocated for storing a state indicator for each individual electrode (e.g., indicating whether the electrode is in a touch state or a no-touch state), and a state indicator for the proximity electrode (e.g., indicating whether the proximity electrode is in a proximal state or a non-proximal state). Initially, the state indicators may be initialized to indicate that each individual electrode is in a no-touch state and that the proximity electrode is in a non-proximal state (unless the system determines otherwise). For ease of explanation, the description below will assume that the method begins with these initial settings.

According to an embodiment, the electrode charging parameters and the analysis parameters may be fixed values, which are not altered throughout operation and the useful life of the device. According to alternate embodiments, the electrode charging parameters and/or the analysis parameters may include values that may be determined and/or modified by the device in order to configure or re-configure the device during operation and/or the useful life of the device. Embodiments of methods of modifying the electrode charging parameters and/or the analysis parameters are not discussed in detail herein, but it is to be understood that such methods are contemplated to be within the scope of the inventive subject matter. The baseline values, the state event detection parameters, and the state indicators, on the other hand, include values that may be altered by the device, as will be described in more detail below.

Once access to the various parameters has been achieved, sensor processing system 500 may enter an electrode monitoring state, within which the sensor processing system 500 repeatedly determines whether touch or release events are occurring for the individual electrodes and whether approach or retreat events are occurring for the proximity electrode. Blocks 606-622 (FIG. 6), described below, are associated with the electrode monitoring state for the individual electrodes, and blocks 630-644 (FIG. 7), described below, are associated with the electrode monitoring state for the proximity electrode. The electrode monitoring process, described below, corresponds to an embodiment in which all of the individual electrodes are monitored in a sequential order, and then the proximity electrode is monitored. The sequential execution of the electrode monitoring processes may be controlled, for example, by sequencer 534, which may provide control signals to IE charge and sense controller 530 and PE charge and sense controller 532, respectively. The control signals provided by sequencer 534 may enable the charge and sense controllers 530, 532 at appropriate times, and may identify an electrode to be selected, according to an embodiment. Although a particular sequence of execution is described below that includes monitoring the individual electrodes first and then monitoring the proximity electrode, it is to be understood that, in alternate embodiments, the proximity electrode may be monitored before the individual electrodes are monitored, or the proximity electrode may be monitored at some point in the sequence of monitoring the individual electrodes. Further, although the electrode monitoring process described below indicates that the proximity electrode is monitored only one time after the sequential monitoring of the individual electrodes, other embodiments may include the proximity electrode being monitored multiple times in conjunction with the sequential monitoring of the individual electrodes. Finally, although it may take several iterations of blocks 606-622 for the capacitive touch and proximity sensor system to reach steady state operation, the below description assumes that a sufficient number of electrode voltage measurements have been performed to establish the capacitive touch and proximity sensor system into steady state operation.

The individual electrode monitoring process may be initiated and controlled by IE charge and sense controller 530, according to an embodiment. To initiate the individual electrode monitoring process, an electrode (e.g., one of electrodes 206-208, FIG. 2) is selected for evaluation, in block 606. As discussed previously, selection of an individual electrode may include the IE charge and sense controller 530 providing a select signal over control line 550 to electrode selection circuitry (e.g., providing a select signal over multiplexer control line 350 to multiplexer I/O 310, FIG. 3).

In block 608, a charging/measurement/filtering process is performed to determine an individual electrode voltage value ("IEVV"). According to an embodiment, the charging/measurement/filtering process includes performing a pre-defined number of charging and measurement cycles for the selected electrode. To initiate a single one of the charging cycles, IE charge and sense controller 530 may retrieve, from data storage 504, the charging current for the selected electrode, and may send a control signal over control line 542 (e.g., control line 342, FIG. 3) to a current source (e.g., current source 304, FIG. 3), which specifies the charging current to be applied to the electrode. In addition, IE charge and sense controller 530 may retrieve, from data storage 504, the charging interval for the selected electrode, and may send a control signal over control line 544 to a clock/timer (e.g., clock timer 306, FIG. 3), which specifies the charging interval. The current source may then provide the charging current to the multiplexer I/O, which in turn may provide the charging current to the selected electrode. The duration of provision of the current may be controlled by the clock/timer.

According to an embodiment, the pre-defined number of charging and measurement cycles performed for a selected electrode may be in a range from one to ten, for example, although the pre-defined number of charging and measurement cycles may be greater than ten, in other embodiments. When the pre-defined number is one, for example, the IEVV equals a single voltage measurement, and when the pre-defined number is greater than one, the IEVV may be defined by a mathematical relationship of the pre-defined number of sequentially obtained voltage measurements. For example, the IEVV may be determined to be an average of the pre-defined number of measured voltages, although the IEVV may be determined using other mathematical relationships, in other embodiments. Each electrode measurement value that corresponds with an IEVV may be received over a digital voltage line 556 (e.g., digital voltage line 356, FIG. 3) by IE sense filter 506. The electrode measurements are passed by the multiplexer I/O from the selected electrode to the IE sense filter 506, according to an embodiment. The IE sense filter 506 is configured to combine a number of electrode measurement values corresponding to pre-defined number in order to generate the IEVV, which the IE sense filter 506 may provide to comparator 510 and IE baseline filter 508. IE sense filter 506, IE baseline filter 508, PE sense filter 512, and PE baseline filter 514 may be implemented as digital (e.g., discrete) filters, according to an embodiment, and/or any one or more of filters 506, 508, 512, and/or 514 may be implemented as continuous filters, according to other embodiments.

In block 610, a determination is made (e.g., by IE charge and sense controller 530) whether the electrode currently is in a touch state or a no touch state. According to an embodiment, this may include accessing a state indicator for the selected electrode from data storage 504. When the electrode is in a no-touch state, a further determination may be made, in block 616, whether the IEVV is above or below the touch detection threshold (e.g., detection threshold 406, FIG. 4). Evaluation of the IEVV with respect to the touch detection threshold may be performed, for example, by comparator 510, which may access a baseline value and state/event detection parameters for the selected electrode from data storage 504. For example, when the IEVV has a value that is greater than the touch detection threshold, the IEVV may be considered to be above the touch detection threshold. Conversely, when the IEVV has a value that is less than the touch detection threshold, the IEVV may be considered to be below the touch detection threshold. The determination of whether the IEVV is above or below the touch detection threshold alternatively may be made by determining a difference between the IEVV and the baseline value for the individual electrode (e.g., a difference between voltage measurement 421 and baseline 404, FIG. 4), and further determining whether the difference is greater than (or greater than or equal to) a stored touch detection delta for the individual electrode (e.g., detection delta 430, FIG. 4).

When it is determined that the IEVV is below the touch detection threshold, then the electrode is transitioned to the touch state, in block 618. According to an embodiment, this may include the sensor processing system 500 storing an indication (e.g., in data storage 504) that the electrode is now in the touch state. In addition, according to an embodiment, the sensor processing system 500 may indicate that a state transition (i.e., from the no-touch state to the touch state) has occurred. For example, the sensor processing system 500 may generate an interrupt on an interrupt line 560 (e.g., interrupt line 360, FIG. 3), which indicates that the electrode has changed states. As discussed previously, such an interrupt may cause a system controller (e.g., system controller 202, FIG. 2) to request information regarding the interrupt (e.g., via line 540), and the capacitive touch and proximity sensor system may return data (e.g., via line 541) which indicates, for example, an identity of the individual electrode and an indicator of a touch event. The system controller may then take whatever action is appropriate, given the circumstances.

Referring again to block 616, when it is determined that the IEVV is above the touch detection threshold, then the system may (or may not) update the stored baseline value for the individual electrode, in block 620. According to an embodiment, this may include performing a filtering process by IE baseline filter 508. Although the term "filtering process" is used herein, the processes performed by IE baseline filter 508 (and PE baseline filter 514) may be referred to more generally as an "analysis." The use of the term "filtering process" is not meant to limit the interpretation of the processes performed by filters 508, 514. IE baseline filter 508 is configured to determine whether and by how much to change the baseline value for the individual electrode. As will be discussed in more detail in conjunction with FIGS. 8-12, the filtering process may take into account various analysis parameters (also referred to herein as "filtering parameters", which reference is not meant to be limiting) in making a determination to change the baseline value and/or in determining by how much to change the baseline value. According to an embodiment, the filtering parameters are accessed by IE baseline filter 508 from data storage 504, and the filtering parameters include one or more parameters selected from a group that includes a filter delay limit (FDL) value, a maximum half delta (MHD) value, a noise half delta (NHD) value, and a noise count limit (NCL) value. The FDL, MHD, NHD, and/or NCL values may be the same for each of the individual electrodes, or they may be different for the individual electrodes. The FDL, MHD, NHD, and/or NCL value(s) for the individual electrodes may be different from the FDL, MHD, NHD, and/or NCL values for the proximity electrode, according to an embodiment. A more detailed explanation of each of these values and their relevance in the filtering operation will be described in more detail in conjunction with FIGS. 8-12, later.

When the filtering process performed by IE baseline filter 508 in conjunction with block 620 indicates that the baseline value for the individual electrode should be changed, the previously stored baseline value may be overwritten with a new value (e.g., the register or memory location in data storage 504 that is associated with the individual electrode's baseline value is overwritten with a new baseline value). A determination of the new baseline value also will be described in more detail in conjunction with FIGS. 8-12, later. When a new baseline value is determined, new touch detection and release detection thresholds for the electrode also may be determined and stored in data storage 504. This enables the baseline for the individual electrode to be dynamically adjusted and accurately maintained in the presence of slowly-varying conditions. Although another embodiment may exclude dynamic adjustment of the baseline, this may increase a likelihood for false touch and/or release detections. As discussed previously in conjunction with FIG. 4, dynamic adjustment of the baseline may be performed during time intervals when the electrode is in a no-touch state, and may be bypassed during time intervals when the electrode is in a touch state, according to an embodiment.

Referring again to block 610, when a determination is made that the electrode is in a touch state, a further determination may be made, in block 612, whether the IEVV is above or below a release detection threshold for the selected electrode (e.g., detection threshold 412, FIG. 4). For example, when the IEVV has a value that is greater than the release detection threshold, the IEVV may be considered to be above the release detection threshold. Conversely, when the IEVV has a value that is less than the release detection threshold, the IEVV may be considered to be below the release detection threshold. The determination of whether the IEVV is above or below the release detection threshold alternatively may be made by determining a difference between the IEVV and the stored baseline value for the individual electrode, and further determining whether the difference is greater than (or greater than or equal to) a release detection delta (e.g., detection delta 432, FIG. 4).

When it is determined that the IEVV is above the release detection threshold, then the electrode is transitioned to the no-touch state, in block 614. According to an embodiment, this may include the capacitive touch and proximity sensor system storing an indication (e.g., in data storage 504) that the electrode is now in the no-touch state. In addition, according to an embodiment, the capacitive touch and proximity sensor system may indicate that a state transition (i.e., from the touch state to the no-touch state) has occurred. For example, the capacitive touch and proximity sensor system may generate an interrupt on interrupt line 560 (e.g., interrupt line 360, FIG. 3), which indicates that the electrode has changed states. As discussed previously, such an interrupt may cause a system controller (e.g., system controller 202, FIG. 2) to request information via line 540 regarding the interrupt, and the capacitive touch sensor may return data on line 541, which indicates, for example, an identity of the individual electrode and an indicator of a release event.

When it is determined that the IEVV is below the release detection threshold (block 612) or upon completion of blocks 614, 618 or 620, the charging and measurement iteration is complete for that individual electrode, and a charging and measurement iteration may be performed for another individual electrode. Accordingly, in block 622, a determination may be made whether all electrodes have been evaluated (e.g., whether a charging and measurement iteration has been performed for each of electrodes 206-208, FIG. 2). When it is determined that all electrodes have not been evaluated (block 622), the method may iterate as shown in FIG. 6, by once again selecting an electrode (block 606) and repeating the charging and measurement processes for the newly selected electrode.

When it is determined that all individual electrodes have been evaluated (block 622), then a proximity electrode may be evaluated. As mentioned previously, a proximity electrode alternatively may be evaluated at an earlier time in the process flow (or multiple times in the process flow). Following sequence designator "A" from FIG. 6 to FIG. 7, the process of monitoring a proximity electrode begins in block 628, by determining whether the proximity electrode (PE) is enabled or disabled. According to an embodiment, the proximity detection feature may be selectively enabled and disabled, as indicated earlier, and a proximity detection enablement indicator may be maintained by the system (e.g., stored in data storage 504 or elsewhere). A determination of whether the proximity electrode is enabled or disabled may be made by accessing and evaluating the proximity detection enablement indicator. When the enablement indicator indicates that the proximity electrode is not enabled, then the charging and monitoring process for the proximity electrode (i.e., blocks 630-644) is bypassed, and the method may proceed to block 646, which will be described later.

When the enablement indicator indicates that the proximity electrode is enabled, then, the process may proceed to block 630, during which a proximity electrode is created by coupling multiple ones of the individual electrodes together. According to an embodiment, creation of the proximity electrode may include the PE charge and sense controller 532 providing a select signal over control line 550 to electrode selection circuitry (e.g., providing a select signal over multiplexer control line 350 to multiplexer I/O 310, FIG. 3). The select signal may identify multiple ones of the individual electrodes, and in response to receiving the select signal, the electrode selection circuitry (e.g., multiplexer I/O 310, FIG. 3) may couple the identified electrodes together in parallel. In other words, the electrode selection circuitry will enable a connection between a current source (e.g., current source 348) and the multiple, identified electrodes for purpose of charging, and subsequently will enable a connection between the multiple, identified electrodes for the purpose of sensing (e.g., in block 632, described below). The proximity electrode may comprise as few as one electrode, although embodiments contemplate the proximity electrode comprising multiple electrodes (e.g., two or more, including possibly all of the individual electrodes). When the proximity electrode includes multiple electrodes, the electrodes may be directly adjacent to each other, or one or more electrodes may be non-adjacent to other electrodes that form the proximity electrode.

In block 632, a charging/measurement process is performed to determine a proximity electrode voltage value ("PEVV"). According to an embodiment, the charging/measurement process includes performing a pre-defined number of charging and measurement cycles for the proximity electrode. The pre-defined number of charging and measurement cycles for the proximity electrode may be the same or different from the pre-defined number of charging and measurement cycles for an individual electrode, in various embodiments. To initiate a single one of the charging cycles, PE charge and sense controller 532 may retrieve, from data storage 504, the charging current for the proximity electrode, and may send a control signal over control line 542 (e.g., control line 342, FIG. 3) to a current source (e.g., current source 304, FIG. 3), which specifies the charging current to be applied to the proximity electrode. In addition, PE charge and sense controller 532 may retrieve, from data storage 504, the charging interval for the proximity electrode, and may send a control signal over control line 544 to a clock/timer (e.g., clock timer 306, FIG. 3), which specifies the charging interval. The current source may then provide the charging current to the multiplexer I/O, which in turn may provide the charging current to the proximity electrode (i.e., a set of multiples ones of the individual electrodes). The duration of provision of the current may be controlled by the clock/timer. According to an embodiment, the charging current to be applied to the proximity electrode and/or the charging interval for the proximity electrode may be different from the charging currents and/or charging intervals for the individual electrodes. For example, the charging current to be applied to the proximity electrode may be higher than that for an individual electrode, since the charging current is driving multiple electrodes, rather than a single electrode. According to a particular embodiment, the charging current applied to the proximity electrode may be roughly equal to the number of electrodes that comprise the proximity electrode multiplied by the charging current for a single electrode.

According to an embodiment, the pre-defined number of charging and measurement cycles performed for the proximity electrode may be in a range from one to ten, for example, although the pre-defined number of charging and measurement cycles may be greater than ten, in other embodiments. When the pre-defined number is one, for example, the PEVV equals a single voltage measurement, and when the pre-defined number is greater than one, the PEVV may be defined by a mathematical relationship of the pre-defined number of sequentially obtained voltage measurements. For example, the PEVV may be determined to be an average of the pre-defined number of measured voltages, although the PEVV may be determined using other mathematical relationships, in other embodiments. Each electrode measurement value that corresponds with a PEVV may be received over a digital voltage line 556 (e.g., digital voltage line 356, FIG. 3) by PE sense filter 512. The electrode measurements are passed by the multiplexer I/O from the selected electrodes that define the proximity electrode to the PE sense filter 512, according to an embodiment. The PE sense filter 512 is configured to combine a number of electrode measurement values corresponding to the pre-defined number in order to generate the PEVV, which the PE sense filter 512 may provide to comparator 516 and PE baseline filter 514.

In block 634, a determination is made (e.g., by PE charge and sense controller 532) whether the proximity electrode currently is in a proximal (PROX) state or a non-proximal (NON-PROX) state. According to an embodiment, this may include accessing a state indicator for the proximity electrode from data storage 504. When the proximity electrode is in a non-proximal state, a further determination may be made, in block 640, whether the PEVV is above or below the approach detection threshold (e.g., detection threshold 406, FIG. 4). Evaluation of the PEVV with respect to the approach detection threshold may be performed, for example, by comparator 516, which may access a baseline value and state/event detection parameters for the proximity electrode from data storage 504. For example, when the PEVV has a value that is greater than the approach detection threshold, the PEVV may be considered to be above the approach detection threshold. Conversely, when the PEVV has a value that is less than the approach detection threshold, the PEVV may be considered to be below the approach detection threshold. The determination of whether the PEVV is above or below the approach detection threshold alternatively may be made by determining a difference between the PEVV and the baseline value for the proximity electrode (e.g., a difference between voltage measurement 421 and baseline 404, FIG. 4), and further determining whether the difference is greater than (or greater than or equal to) a stored approach detection delta for the proximity electrode (e.g., detection delta 430, FIG. 4).

When it is determined that the PEVV is below the approach detection threshold, then the electrode is transitioned to the proximal state, in block 642. According to an embodiment, this may include the sensor processing system 500 storing an indication (e.g., in data storage 504) that the proximity electrode is now in the proximal state. In addition, according to an embodiment, the sensor processing system 500 may indicate that a state transition (i.e., from the non-proximal state to the proximal state) has occurred. For example, the sensor processing system 500 may generate an interrupt on an interrupt line 560 (e.g., interrupt line 360, FIG. 3), which indicates that the proximity electrode has changed states. As discussed previously, such an interrupt may cause a system controller (e.g., system controller 202, FIG. 2) to request information regarding the interrupt (e.g., via line 540), and the capacitive touch and proximity sensor system may return data (e.g., via line 541) which indicates, for example, an identity of the proximity electrode and an indicator of an approach event. The system controller may then take whatever action is appropriate, given the circumstances.

Referring again to block 640, when it is determined that the PEVV is above the approach detection threshold, then the system may (or may not) update the stored baseline value for the proximity electrode, in block 644. According to an embodiment, this may include performing a filtering process by PE baseline filter 514. PE baseline filter 514 is configured to determine whether and by how much to change the baseline value for the proximity electrode. As will be discussed in more detail in conjunction with FIGS. 8-12, the filtering process may take into account various filtering parameters in making a determination to change the baseline value and/or in determining by how much to change the baseline value. According to an embodiment, the filtering parameters are accessed by PE baseline filter 514 from data storage 504, and the filtering parameters include one or more parameters selected from a group that includes an FDL, an MHD value, an NHD value, and an NCL value, as described previously with respect to the individual electrodes. According to an embodiment, the FDL, MHD, NHD, and/or NCL value for the proximity electrode may be different from the FDL, MHD, NHD, and/or NCL values for the individual electrodes. A more detailed explanation of each of these values and their relevance in the filtering operation will be described in more detail in conjunction with FIGS. 8-12, later.

When the filtering process performed by PE baseline filter 514 in conjunction with block 644 indicates that the baseline value for the proximity electrode should be changed, the previously stored baseline value may be overwritten with a new value (e.g., the register or memory location in data storage 504 that is associated with the proximity electrode's baseline value is overwritten with a new baseline value). A determination of the new baseline value also will be described in more detail in conjunction with FIGS. 8-12, later. When a new baseline value is determined, new approach detection and retreat detection thresholds for the proximity electrode also may be determined and stored in data storage 504. This enables the baseline for the proximity electrode to be dynamically adjusted and accurately maintained in the presence of slowly-varying conditions. Although another embodiment may exclude dynamic adjustment of the baseline, this may increase a likelihood for false approach and/or retreat detections. According to an embodiment, dynamic adjustment of the baseline may be performed during time intervals when the proximity electrode is in a non-proximal state, and may be bypassed during time intervals when the electrode is in a proximal state, according to an embodiment.

Referring again to block 634, when a determination is made that the proximity electrode is in a proximal state, a further determination may be made, in block 636, whether the PEVV is above or below a retreat detection threshold for the proximity electrode (e.g., detection threshold 412, FIG. 4). For example, when the PEVV has a value that is greater than the retreat detection threshold, the PEVV may be considered to be above the retreat detection threshold. Conversely, when the PEVV has a value that is less than the retreat detection threshold, the PEVV may be considered to be below the retreat detection threshold. The determination of whether the PEVV is above or below the retreat detection threshold alternatively may be made by determining a difference between the PEVV and the stored baseline value for the proximity electrode, and further determining whether the difference is greater than (or greater than or equal to) a retreat detection delta (e.g., detection delta 432, FIG. 4).

When it is determined that the PEVV is above the retreat detection threshold, then the proximity electrode is transitioned to the non-proximal state, in block 638. According to an embodiment, this may include the capacitive touch and proximity sensor system storing an indication (e.g., in data storage 504) that the proximity electrode is now in the non-proximal state. In addition, according to an embodiment, the capacitive touch and proximity sensor system may indicate that a state transition (i.e., from the proximal state to the non-proximal state) has occurred. For example, the capacitive touch and proximity sensor system may generate an interrupt on interrupt line 560 (e.g., interrupt line 360, FIG. 3), which indicates that the proximity electrode has changed states. As discussed previously, such an interrupt may cause a system controller (e.g., system controller 202, FIG. 2) to request information via line 540 regarding the interrupt, and the capacitive touch sensor may return data on line 541, which indicates, for example, an identity of the proximity electrode and an indicator of a retreat event.

When it is determined that the PEVV is below the retreat detection threshold (block 636) or upon completion of blocks 638, 642 or 644, the charging and measurement iteration is complete for the proximity electrode. When this occurs, the capacitive touch and proximity sensor system may enter an idle state, in block 646, during which the capacitive touch and proximity sensor system temporarily ceases electrode evaluations during an idle time period (e.g., from 1 to 100 milliseconds or some other time period). Upon expiration of the idle time period, blocks 606-646 may be repeated, as indicated by following sequence designator "B" from FIG. 7 to FIG. 6.

As discussed above in conjunction with blocks and 620 and 644 of FIGS. 6 and 7, a first filtering process may be performed for an individual electrode (block 620) to determine whether to change the baseline value for the individual electrode, and a second and different filtering process may be performed for the proximity electrode (block 644) to determine whether to change the baseline value for the proximity electrode. The first and second filtering processes may use the same filtering algorithms (or hardware) with different parameters, according to an embodiment, or they may use different filtering algorithms (or hardware). The below description assumes that the same filtering algorithm is used for the first and second filtering processes, with different filtering parameters, but this is not intended to be limiting.

According to an embodiment, the first filtering process (for an individual electrode) includes application of a filter having a first frequency response to measured electrode voltage values for an individual electrode, and the second filtering process (for a proximity electrode) includes application of a filter having a second and different frequency response to measured electrode voltage values for the proximity electrode. According to a more specific embodiment, the filter response time associated with the first filtering process is significantly faster than the filter response time associated the second filtering process. According to an even more specific embodiment, the first filtering process includes application of a low pass filter having a first cutoff frequency to measured electrode voltage values for an individual electrode, and the second filtering process includes application of a low pass filter having a second and different cutoff frequency to measured electrode voltage values for the proximity electrode, where the first cutoff frequency is higher than the second cutoff frequency. According to an embodiment, the first cutoff frequency is at least twice the second cutoff frequency, although the difference between cutoff frequencies may be smaller, in other embodiments. According to another embodiment, the first cutoff frequency is at least four times the second cutoff frequency.

The differences between the first and second filtering processes are implemented by using different filtering parameters for individual electrodes as opposed to the proximity electrode, according to an embodiment. As mentioned previously, filtering parameters may include the following: a maximum half delta (MHD) value; a noise half delta (NHD) value; a noise count limit (NCL) value; and a filter delay limit (FDL) value, each of which will be described in more detail below. Essentially, these filtering parameters constrain the filtering processes performed for the individual electrodes and for the proximity electrode, as will be explained below.

As discussed above, some or all of the MHD, NHD, NCL, and/or FDL values may be different for the individual electrodes than they are for the proximity electrode. According to a more specific embodiment, the MHD value is smaller (e.g., by a factor of ½ or some other factor) for the proximity electrode than for any individual electrode, the NHD value is smaller (e.g., by a factor of ½ or some other factor) for the proximity electrode than for any individual electrode, the NCL value(s) are larger (e.g., by a factor of 2 or some other factor) for the proximity electrode than for any individual electrode, and/or the FDL value is larger (e.g., by a factor of 2 or some other factor) for the proximity electrode than for any individual electrode.

Figure 8:
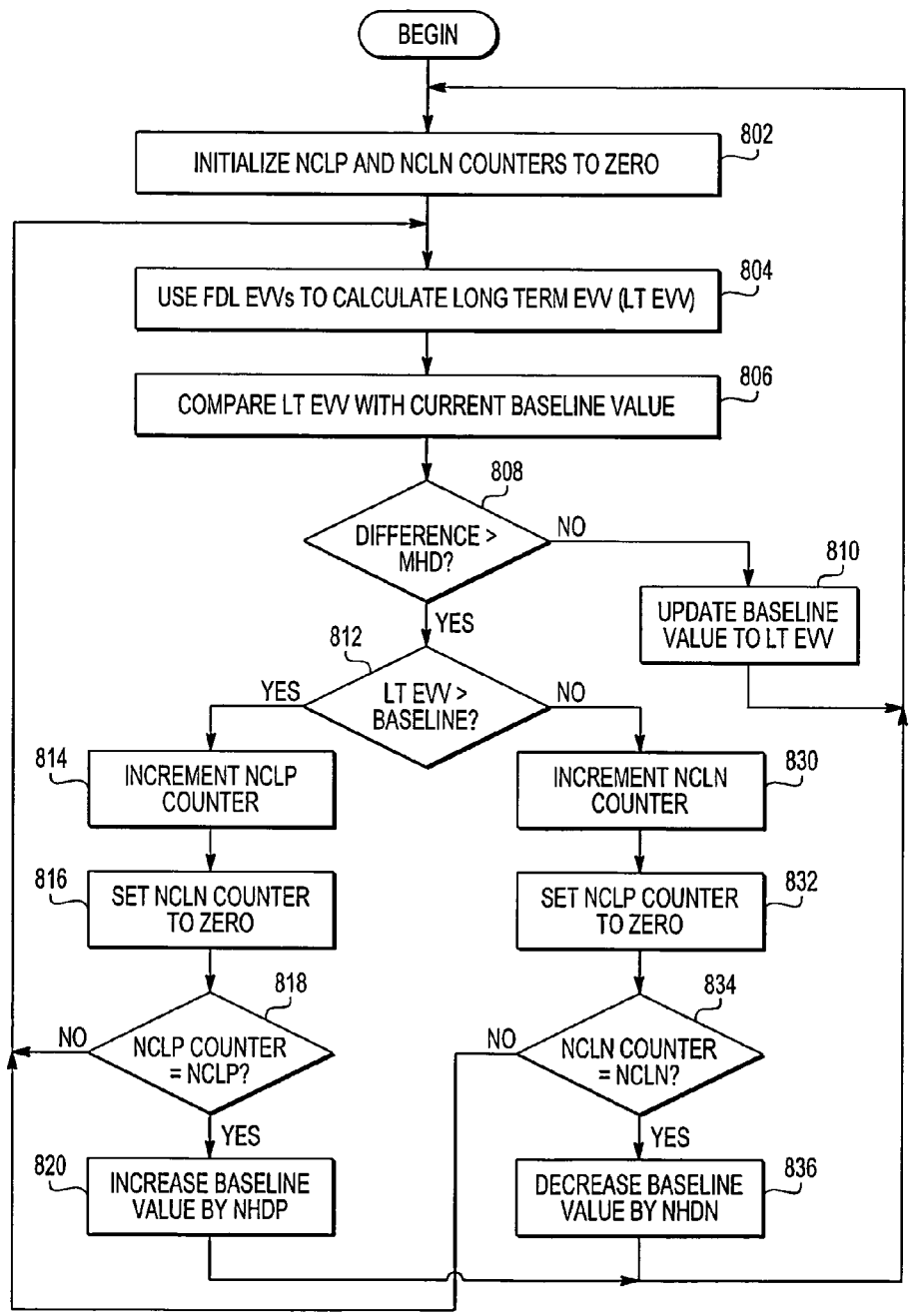
FIG. 8 is a flowchart of a method for filtering sensed data for the purpose of touch baseline or proximity baseline maintenance, according to an example embodiment.

The differences between the first filtering process (e.g., block 620, FIG. 6 for an individual electrode) and the second filtering process (e.g., block 644, FIG. 6 for a proximity electrode) are implemented with the same filtering algorithm, although with different filtering parameters, according to an embodiment. As mentioned previously, however, the differences between the first and second filtering processes may be implemented using different filtering algorithms and/or different hardware, in other embodiments. The former embodiment is described in detail in conjunction with FIG. 8, although it is not intended to be limiting. In addition, although FIG. 8 depicts a particular filtering algorithm that uses particular filtering parameters, it is to be understood that other filtering algorithms may be implemented that use other filtering parameters (e.g., more, fewer or different filtering parameters). The algorithm described in conjunction with FIG. 8, below, is provided for the purpose of example, and not of limitation. Although the steps of the algorithm depicted in FIG. 8 are discussed only once, below, it is to be understood that the algorithm may be executed for an individual electrode or the proximity electrode using different filtering parameters. In addition, it should be noted that a different instantiation of the filtering algorithm may be in progress, in parallel, for each individual electrode and for the proximity electrode, although only the instantiation associated with an electrode being evaluated may be progressing through the various states of the filter at any given time.

FIG. 8 is a flowchart of a method for filtering sensed data for the purpose of touch baseline or proximity baseline maintenance, according to an example embodiment. The method may be performed, for example, using IE baseline filter 508 or using PE baseline filter 514, depending on whether electron voltage values (EVVs) from an individual electrode or the proximity electrode are being filtered. The method may be performed, for example, in conjunction with either or both of the filtering processes of blocks 620 and 644. However, some or all of the filtering parameters (e.g., MHD, NHD, NCL, and FCL) may be different for the individual electrodes and for the proximity electrode, as discussed previously. In the below description, an assumption is made that the filtering process has achieved steady state, meaning that a sufficient number of EVVs have been received and processed to place the filter in a steady state mode.

The method may begin, in block 802, by initializing one or more NCL counters. According to an embodiment, two NCL counters are implemented, which include an NCLP (NCL positive) and an NCLN (NCL negative) counter. The relevance of the NCL counters will be clarified later in the discussion of blocks 818 and 834. Briefly, the NCLP counter is used to indicate a number of consecutive LT EVV samples that have values above the baseline for the electrode under evaluation (and that have differences with the baseline that are greater than the MED value) before a determination of non-noise is made. Similarly, the NCLN counter is used to indicate a number of consecutive LT EVV samples that have values below the baseline (and that have differences with the baseline that are greater than the MHD value) before a determination of non-noise is made. In an embodiment in which counters are incremented until some count-up threshold (e.g., NCLP or NCLN) is reached, both counters may be initialized to zero. Alternatively, in an embodiment in which counters are decremented until some count-down threshold (e.g., zero) is reached, the counters may be initialized to NCLP and NCLN, respectively. The former embodiment is described below.

In block 804, one or more previously received EVVs are used to calculate (e.g., by IE baseline filter 508 or PE baseline filter 514, FIG. 5) a long term EVV (LT EVV) that is operated on by subsequent stages of the filtering algorithm. The LT EVV may be referred to generally in the description and claims as a "comparison value." According to an embodiment, the number of EVVs that are used to calculate the LT EVV equals the FDL value for the electrode whose data is being filtered (either an individual electrode or the proximity electrode). The FDL value specifies a number of consecutive EVV samples, for a given electrode, that are used to mathematically produce the LT EVV. For example, when an FDL value for an electrode equals four, then four EVVs for that electrode will be used to calculate an LT EVV.

The FDL value indicates the rate of operation of the filter, where a larger value may cause the filter to operate more slowly. FDL values may be in a range from 1 to 15, according to an embodiment, although the range may be different in other embodiments. The previously received EVVs and the FDL value for the electrode whose data is being filtered may be retrieved from data storage (e.g., data storage 504, FIG. 5). According to an embodiment, calculation of the LT EVV may include averaging the values of the FDL EVVs, although the calculation may include a different mathematical operation, as well.

In block 806, the LT EVV (i.e., the comparison value) is compared with the current baseline value for the electrode whose data is being filtered. The current baseline value for the electrode may be retrieved from data storage (e.g., data storage 504, FIG. 5). According to an embodiment, comparison of the LT EVV with the current baseline includes calculating a difference between the LT EVV and the baseline.

In block 808, a determination is made whether the difference between the LT EVV and the baseline is greater than (or greater than or equal to) the MHD value for the electrode whose data is being filtered. The MHD value specifies the largest difference between an LT EVV and a baseline value that classifies the LT EVV as non-noise. The MHD value for the electrode may be retrieved from data storage (e.g., data storage 504, FIG. 5). MHD values may be in a range from 1 to 63, according to an embodiment, although the range may be different in other embodiments.

When the difference between the LT EVV and the baseline is less than or equal to (or simply less than) the MHD value, the LT EVV may be considered as non-noise drift, and the baseline value for the electrode is updated, in block 810. According to an embodiment, the baseline value is updated to the LT EVV. The baseline value may be updated to some value between the current baseline value and the LT EVV, in another embodiment. According to an embodiment, the baseline value for the electrode may be updated by overwriting the stored baseline value (e.g., in data storage 504, FIG. 5) with the new baseline value. The method may then iterate as shown, where the next iteration of the method may occur in conjunction of the receipt of a subsequent EVV for the electrode.

Referring again to block 808, when the difference between the LT EVV and the baseline is greater than (or greater than or equal to) the MHD, the LT EVV may be considered as noise, although it is not necessarily so. Further evaluations may indicate whether or not the LT EVV should be considered as noise, as will be described below. In an embodiment in which potential noise samples above and below the baseline are considered separately, the potential noise sample may be characterized as being greater than or less than the baseline value for the electrode. Accordingly, in block 812, a determination is made whether the LT EVV is greater than (or greater than or equal to) the baseline value for the electrode.

When the LT EVV is greater than (or greater than or equal to) the baseline value for the electrode, then the NCLP counter is incremented, in block 814. This indicates that the LT EVV value is considered one of a consecutive set of LT EVVs having a value above the baseline (and a difference with the baseline that is greater than the MHD value). In addition, the NCLN counter is set to zero, in block 816. As mentioned previously, the NCLN counter is used to indicate a number of consecutive LT EVV samples that have values below the baseline (and that have differences with the baseline that are greater than the MHD value) before a determination of non-noise is made. Therefore, even if the NCLN counter has a non-zero value, the receipt of an LT EVV sample that has a value above the baseline (and that has a difference with the baseline that is greater than the MHD value) would break the consecutive receipt of LT EVV samples that have values below the baseline. Therefore, it is appropriate for the NCLN counter to be reset to zero.

In block 818, a determination is made whether the NCLP counter equals an NCLP value for the electrode whose data is being filtered. For each electrode (including the proximity electrode), a stored NCL value specifies the number, which must occur, of consecutive LT EVV samples that have a difference with the baseline that is greater than the MHD before a determination of non-noise drift is made. NCL values may be in a range from 1 to 15 samples, according to an embodiment, although the range may be different in other embodiments. According to an embodiment, two NCL values are implemented for the electrodes, where an NCLP value specifies the number, which must occur, of consecutive LT EVV samples that have values above the baseline (and that have differences with the baseline that are greater than the MHD value) before a determination of non-noise is made. The NCLP counter tracks this number. The second NCL value, denoted NCLN, specifies the number, which must occur, of consecutive LT EVV samples that have values below the baseline (and that have differences with the baseline that are greater than the MHD value) before a determination of non-noise is made. The NCLN counter tracks this number. In another embodiment, only a single NCL value may be implemented. The NCLP and NCLN (or a single NCL value) may be retrieved from data storage (e.g., data storage 504, FIG. 5). When a determination is made that the NCLP counter does not equal the NCLP value for the electrode, then the method iterates as shown, and no update to the baseline is made.

Conversely, when a determination is made that the NCLP counter equals the NCLP value for the electrode, then the baseline value for the electrode is updated, in block 820. According to an embodiment, the baseline value is increased by an NHD value. For each electrode, an NHD value specifies an incremental change to be applied to the baseline value when non-noise drift is detected, which exceeds the MHD threshold. NHD values may be in a range from 1 to 63, according to an embodiment, although the range may be different in other embodiments. According to an embodiment, two NHD values are implemented for the electrodes, where an NHDP value specifies an incremental change to be applied to the baseline value when non-noise drift is detected that has a magnitude that is greater than the baseline value. The second NHD value, denoted NHDN, specifies an incremental change to be applied to the baseline value when non-noise drift is detected that has a magnitude that is less than the baseline value. In another embodiment, only a single NHD value may be implemented. The NHDP and NHDN (or a single NHD value) may be retrieved from data storage (e.g., data storage 504, FIG. 5). According to another embodiment, the baseline value may be increased by some value other than the NHD value (e.g., by the last LT EVV sample received or an average of multiple, previously received LT EVV samples). Either way, the baseline value for the electrode may be updated by overwriting the stored baseline value (e.g., in data storage 504, FIG. 5) with the new baseline value. The method may then iterate as shown, where the next iteration of the method may occur in conjunction of the receipt of a subsequent EVV for the electrode.

Referring again to block 812, when the LT EVV is less than or equal to (or simply less than) the baseline value for the electrode, then the NCLN counter is incremented, in block 830. This indicates that the LT EVV value is considered one of a consecutive set of LT EVVs having a value below the baseline (and a difference with the baseline that is greater than the MHD value). In addition, the NCLP counter is set to zero, in block 832. As mentioned previously, the NCLP counter is used to indicate a number of consecutive LT EVV samples that have values above the baseline (and that have differences with the baseline that are greater than the MHD value) before a determination of non-noise is made. Therefore, even if the NCLP counter has a non-zero value, the receipt of an LT EVV sample that has a value below the baseline (and that has a difference with the baseline that is greater than the MHD value) would break the consecutive receipt of LT EVV samples that have values above the baseline. Therefore, it is appropriate for the NCLP counter to be reset to zero.

In block 834, a determination is made whether the NCLN counter equals an NCLN value for the electrode whose data is being filtered. When a determination is made that the NCLN counter does not equal the NCLN value for the electrode, then the method iterates as shown, and no update to the baseline is made. Conversely, when a determination is made that the NCLN counter equals the NCLN value for the electrode, then the baseline value for the electrode is updated, in block 836. According to an embodiment, the baseline value is decreased by an NHD value. According to a more specific embodiment, the baseline value is decreased by an NHDN value, discussed previously. According to another embodiment, the baseline value may be decreased by some value other than the NHD value (e.g., by the last LT EVV sample received or an average of multiple, previously received LT EVV samples). Either way, the baseline value for the electrode may be updated by overwriting the stored baseline value (e.g., in data storage 504, FIG. 5) with the new baseline value. The method may then iterate as shown, where the next iteration of the method may occur in conjunction of the receipt of a subsequent EVV for the electrode.

FIGS. 9-12 are charts illustrating various examples of EVVs plotted in conjunction with baseline values, and these Figures are intended to further clarify the operation of the filtering parameters discussed previously. In the charts, the vertical axis indicates magnitude (e.g., of an EVV sample or the baseline), and the horizontal axis indicates time. Each horizontal grid line may be considered to be a difference in magnitude of one increment, and each vertical grid line corresponds to a sample (e.g., an EVV). Each circle represents a sample value, and each short dash indicates a current baseline value for the electrode.

Figure 9:
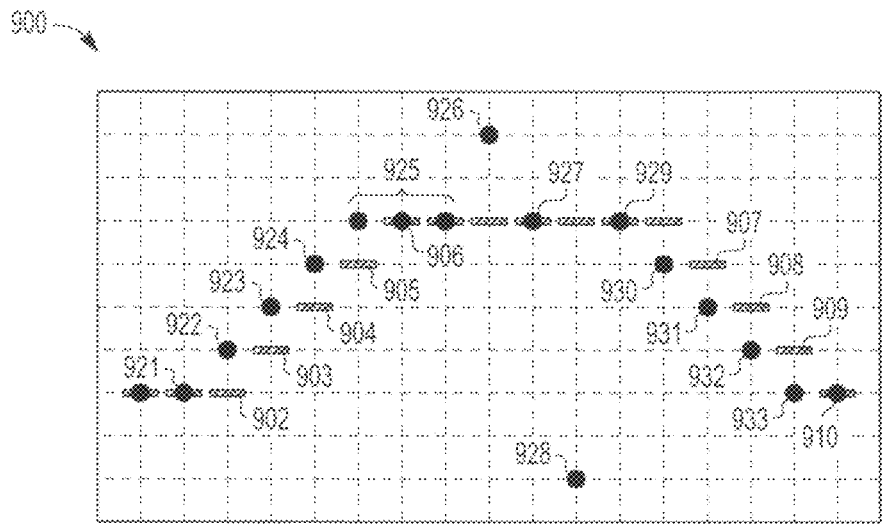
FIG. 9 is a chart illustrating a first example of electrode voltage measurements plotted in conjunction with a sensing baseline, according to an example embodiment.

FIG. 9 is a chart 900 illustrating a first example of EVV measurements plotted in conjunction with a sensing baseline, according to an example embodiment. This example is provided to illustrate that small incremental changes to the system may represent long term and slow (e.g., environmental) changes. The example assumes that a MHD value for the electrode equals 1. Accordingly, the largest difference between an EVV and a baseline value that classifies the EVV as non-noise is a value of 1.

EVV 921 represents a temporary state during which the baseline value 902 equals the value of EVV 921. EVV 922 has a value that is one increment above baseline value 902. Since the difference between EVV 922 and baseline value 902 is not greater than the MHD (e.g., the comparison made in block 808, FIG. 8), then the baseline value is updated to value 903, which corresponds with the value of EVV 922 (e.g., in block 810, FIG. 8). Each of EVVs 923, 924, 925 show increases of one increment above the then-current baseline values 903, 904, and 905, respectively, and therefore the baseline values are increased accordingly to track the changes, until a baseline value of 906 is reached.

EVV 926 is then received, which has a value that is two increments above baseline value 906. Since the difference between EVV 926 and baseline value 906 is greater than the MHD (e.g., the comparison made in block 808, FIG. 8), then the baseline value is not updated, assuming that the NCLP value for the electrode is greater than one. After EVV 927, EVV 928 is received, which has a value that is six increments below baseline value 906. Since the difference between EVV 928 and baseline value 902 is greater than the MHD (e.g., the comparison made in block 808, FIG. 8), then the baseline value is not updated, assuming that the NCLN value for the electrode is greater than one. After EVV 929, the EVVs 930, 931, 932, 933 show decreases of one increment below the then-current baseline values 906, 907, 908, and 909, respectively, and ultimately a baseline value of 910 is reached.

Figure 10:
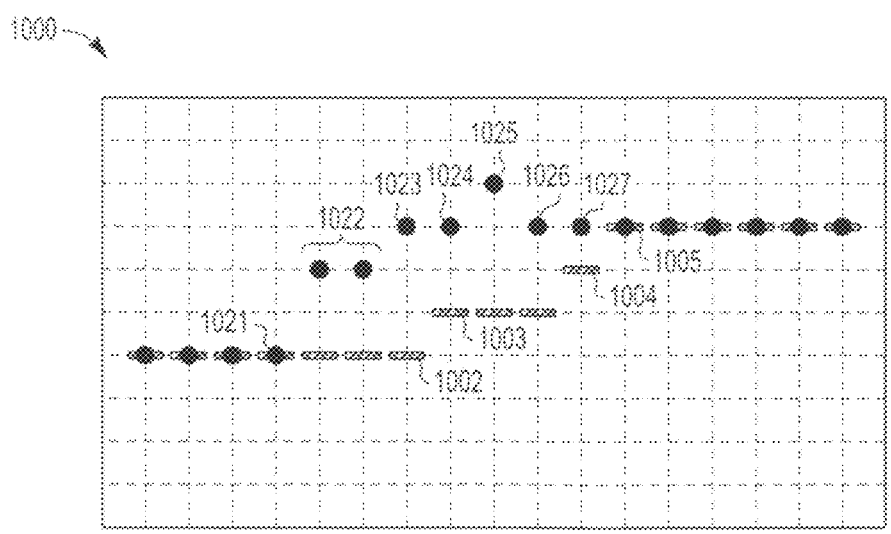
FIG. 10 is a chart illustrating a second example of electrode voltage measurements plotted in conjunction with a sensing baseline, according to an example embodiment.

FIG. 10 is a chart 1000 illustrating a second example of electrode voltage measurements plotted in conjunction with a sensing baseline, according to an example embodiment. This example is provided to illustrate that relatively large EVV changes may be regarded as noise and accounted for by the values of the NHD and NCL. Values that are outside the MHD are rejected by the filtering process, in general. However, when a sufficient number (e.g., NCL) of sequential values are outside the MHD (in the same direction), then the baseline may be adjusted. The NCL regulates how many sequential data points are to be seen before the baseline is adjusted, and the NHD specifies the magnitude of the adjustment. The example assumes that a MHD value for the electrode equals 1, the NCL value equals 3, and the NHD value equals 1.

EVV 1021 represents a temporary state during which the baseline value 1002 equals the value of EVV 1021. EVVs 1022 each have a value that is two increments above baseline value 1002, and EVV 1023 has an increment that is three increments above baseline value 1002. Since EVVs 1022, 1023 are consecutive, and the difference between EVVs 1022, 1023 and baseline value 1002 is greater than the MHD (e.g., the comparison made in block 808, FIG. 8), the NCL counter would have been incremented to three (e.g., in block 814, FIG. 8). Accordingly, the NCL counter equals the NCL (e.g., as determined in block 818, FIG. 8), and the baseline value is increased by the NHD value of 1 to value 1003 (e.g., in block 820, FIG. 8). Similarly, the differences between the next three consecutive EVVs 1024, 1025, 1026 and baseline value 1003 also are greater than the MHD, and accordingly, the baseline value again is increased by the NHD value of 1 to value 1004. EVV 1027 is thereafter received, which has a value that is one increment above baseline value 1004. Because the difference between EVV 1027 and baseline value 1004 is not greater than the MHD (e.g., the comparison made in block 808, FIG. 8), then the baseline value is updated to value 1005, which corresponds with the value of EVV 1027 (e.g., in block 810, FIG. 8).

Figure 11:
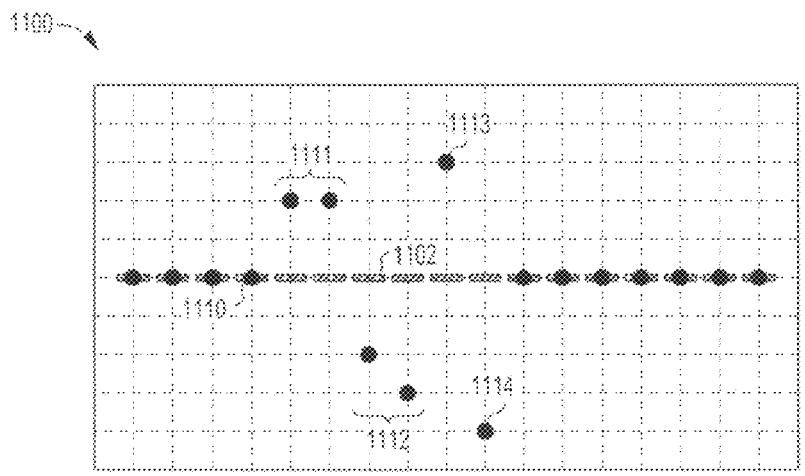
FIG. 11 is a chart illustrating a third example of electrode voltage measurements plotted in conjunction with a sensing baseline, according to an example embodiment.

FIG. 11 is a chart 1100 illustrating a third example of electrode voltage measurements plotted in conjunction with a sensing baseline, according to an example embodiment. This example is provided to illustrate that, when received EVVs are greater than the MHD, but consecutive EVVs are inconsistently are higher or lower than the baseline, the baseline will not be modified (e.g., as described in conjunction with the NCLP and NCLN counters of FIG. 8). The example assumes that a MHD value for the electrode equals 1, the NCLP value equals 3, and the NCLN value equals 3.

EVV 1110 represents a temporary state during which the baseline value 1102 equals the value of EVV 1110. EVVs 1111 each have a value that is two increments above baseline value 1102, and EVV 1112 have values that are two or three increments below baseline value 1102. Although EVVs 1111 are consecutive, and the difference between EVVs 1111 and baseline value 1102 is greater than the MHD (e.g., the comparison made in block 808, FIG. 8), the NCLP counter would have been incremented only to two (e.g., in block 814, FIG. 8) before it was reset (e.g., in block 832, FIG. 8) as a result of receiving EVVs 1112, which fall below the baseline value 1102. Accordingly, the NCLP counter does not attain a value equal to the NCLP value (e.g., as determined in block 818, FIG. 8), and the baseline value is not increased. Similarly, although EVVs 1112 are consecutive, and the difference between EVVs 1112 and baseline value 1102 is greater than the MHD (e.g., the comparison made in block 808, FIG. 8), the NCLN counter would have been incremented only to two (e.g., in block 830, FIG. 8) before it was reset (e.g., in block 816, FIG. 8) as a result of receiving EVV 1113, which falls above the baseline value 1102. Accordingly, the NCLN counter does not attain a value equal to the NCLN value (e.g., as determined in block 834, FIG. 8), and the baseline value is not decreased. Similar processing of EVVs 1113 and 1114 would be performed, with neither EVV resulting in an NCL counter reaching an NCL value. Accordingly, in the example of FIG. 11, the baseline is not adjusted.

Figure 12:
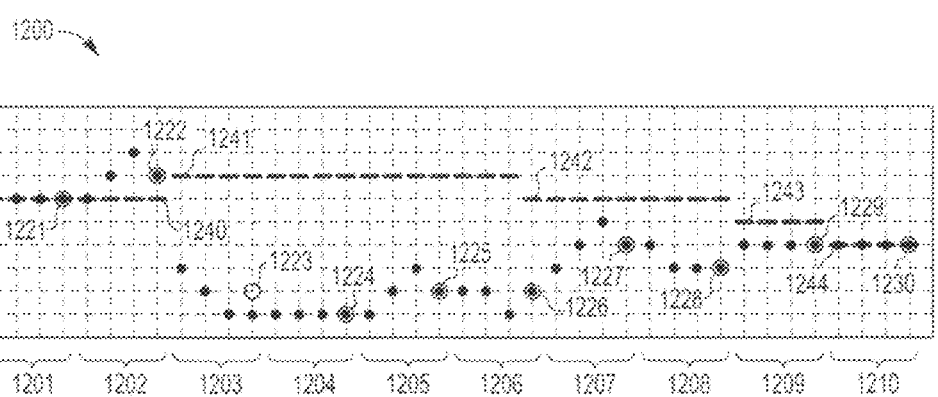
FIG. 12 is a chart illustrating a fourth example of electrode voltage measurements plotted in conjunction with a sensing baseline, according to an example embodiment.

FIG. 12 is a chart 1200 illustrating a fourth example of electrode voltage measurements plotted in conjunction with a sensing baseline, according to an example embodiment. This example is provided to illustrate that the FDL may be implemented to reject low frequency changes to the data, and to slow down the overall system. According to an embodiment, and as discussed previously, the FDL value for an electrode indicates the number of EVVs that may be combined to produce an LT EVV that is supplied to the subsequent filtering stages. The example assumes that a MHD value for the electrode equals 1, the NCLP value equals 3, the NCLN value equals 3, the NHDP value equals 1, and the FDL value equals 4.

With an FDL value of 4, each set of four consecutive EVVs (represented by solid circles) are used to generate an LT EVV (represented by hollow circles). Accordingly, EVVs 1201 are used to generate LT EVV 1221 (e.g., in block 804, FIG. 8), EVVs 1202 are used to generate LT EVV 1222, EVVs 1203 are used to generate LT EVV 1223, EVVs 1204 are used to generate LT EVV 1224, EVVs 1205 are used to generate LT EVV 1225, EVVs 1206 are used to generate LT EVV 1226, EVVs 1207 are used to generate LT EVV 1227, EVVs 1208 are used to generate LT EVV 1228, EVVs 1209 are used to generate LT EVV 1229, and EVVs 1210 are used to generate LT EVV 1230. It is the LT EVVs 1221-1230 that are subsequently evaluated to determine whether to adjust the baseline value for the electrode.

For example, LT EVV 1221 is equal to baseline value 1240, and therefore no baseline adjustment is made. EVV 1222 is one increment above baseline value 1240. Since the difference between LT EVV 1222 and baseline value 1240 is not greater than the MHD (e.g., the comparison made in block 808, FIG. 8), then the baseline value is updated to value 1241 (e.g., in block 810, FIG. 8). LT EVVs 1223, 1224, and 1225 each have a value that is five or six increments below baseline value 1241. Since LT EVVs 1223-1225 are consecutive, and the difference between LT EVVs 1223-1225 and baseline value 1241 is greater than the MHD (e.g., the comparison made in block 808, FIG. 8), the NCLN counter would have been incremented to three (e.g., in block 830, FIG. 8). Accordingly, the NCLN counter equals the NCLN (e.g., as determined in block 834, FIG. 8), and the baseline value is decreased by the NHDN value of 1 to value 1242 (e.g., in block 836, FIG. 8). Similarly, the differences between the next three consecutive LT EVVs 1226, 1227, 1228 and baseline value 1242 also are greater than the MHD, and accordingly, the baseline value again is decreased by the NHDN value of 1 to value 1243. LT EVV 1229 is thereafter determined, which has a value that is one increment below baseline value 1243. Because the difference between LT EVV 1229 and baseline value 1243 is not greater than the MHD (e.g., the comparison made in block 808, FIG. 8), then the baseline value is updated to value 1244, which corresponds with the value of LT EVV 1229 (e.g., in block 810, FIG. 8).

Thus, various embodiments of methods and apparatus for configuring a capacitive touch sensor device have been described above. The various embodiments enable different analysis (e.g., filtering) and/or charging parameters to be established for each of multiple electrodes (e.g., electrodes 106-108, FIG. 1) and the proximity electrode, or for all of the individual electrodes and the proximity electrode. An embodiment includes a method for performing capacitive touch sensing and proximity detection. The method comprises the steps of establishing a first connection with an individual electrode of a plurality of individual electrodes in order to receive one or more first signals indicating a state of the individual electrode, and performing a first analysis (e.g., a first filtering process) on the one or more first signals to determine whether to perform a first updating process for an individual electrode baseline value. The method also comprises the steps of establishing second connections with a proximity electrode that comprises multiple ones of the plurality of individual electrodes in order to receive one or more second signals indicating a state of the proximity electrode, and performing a second analysis (e.g., a second filtering process) on the one or more second signals to determine whether to perform a second updating process for a proximity electrode baseline value, where the first analysis and the second analysis are different from each other. According to a further embodiment, the method also comprises determining whether the proximity electrode is enabled or disabled, and when the proximity electrode is disabled, bypassing the steps of establishing the second connections and performing the second analysis. According to another further embodiment, the multiple ones of the plurality of individual electrodes comprising the proximity electrode are in a close proximity to each other.

Another embodiment includes a method for performing capacitive touch sensing and proximity detection that comprises the steps of storing first charging parameters and first analysis parameters associated with performing first charging and sensing processes for an individual electrode of a plurality of individual electrodes, and storing second charging parameters and second analysis parameters associated with performing second charging and sensing processes for a proximity electrode that comprises multiple ones of the plurality of individual electrodes, where the first charging and sensing operations are configured differently from the second charging and sensing operations. The method further comprises the steps of establishing a first connection with the individual electrode, charging the individual electrode in accordance with the first charging parameters, receiving a first signal indicating a state of the individual electrode, and determining, based on the first signal, whether to perform a first updating process for an individual electrode baseline value by performing a first analysis (e.g., a first filtering process) that is constrained by the first analysis parameters. The method further comprises the steps of establishing second connections with the proximity electrode, charging the proximity electrode in accordance with the second charging parameters, providing a second signal indicating a state of the proximity electrode, and determining, based on the second signal, whether to perform a second updating process for a proximity electrode baseline value by performing a second analysis (e.g., a second filtering process) that is constrained by the second analysis parameters.

Yet another embodiment includes capacitive touch and proximity sensor system comprising electrode selection circuitry and a processing system, operatively coupled with the electrode selection circuitry. The electrode selection circuitry is configured to establish a first connection with an individual electrode of a plurality of individual electrodes in order to receive one or more first signals indicating a state of the individual electrode, and to establish second connections with a proximity electrode that comprises multiple ones of the plurality of individual electrodes in order to receive one or more second signals indicating a state of the proximity electrode. The processing system is configured to perform a first analysis (e.g., a filtering process) on the one or more first signals to determine whether to perform a first updating process for an individual electrode baseline value, and to perform a second analysis (e.g., a second filtering process) on the one or more second signals to determine whether to perform a second updating process for a proximity electrode baseline value, where the first analysis and the second analysis are different from each other.

The terms "first," "second," "third," "fourth" and the like in the description and the claims, if any, may be used for distinguishing between similar elements or steps and not necessarily for describing a particular sequential or chronological order. It is to be understood that the terms so used are interchangeable under appropriate circumstances such that the embodiments described herein are, for example, capable of operation or fabrication in sequences or arrangements other than those illustrated or otherwise described herein. In addition, the sequence of processes, blocks or steps depicted in and described in conjunction with any flowchart is for example purposes only, and it is to be understood that various processes, blocks or steps may be performed in other sequences and/or in parallel, in other embodiments, and/or that certain ones of the processes, blocks or steps may be combined, deleted or broken into multiple processes, blocks or steps, and/or that additional or different processes, blocks or steps may be performed in conjunction with the embodiments. Furthermore, the terms "comprise," "include," "have" and any variations thereof, are intended to cover non-exclusive inclusions, such that a process, method, article, or apparatus that comprises a list of elements or steps is not necessarily limited to those elements or steps, but may include other elements or steps not expressly listed or inherent to such process, method, article, or apparatus. The terms "coupled" and "operatively coupled," as used herein, are defined as directly or indirectly connected in an electrical or non-electrical manner.

It is to be understood that various modifications may be made to the above-described embodiments without departing from the scope of the inventive subject matter. While the principles of the inventive subject matter have been described above in connection with specific systems, apparatus, and methods, it is to be clearly understood that this description is made only by way of example and not as a limitation on the scope of the inventive subject matter. The various functions or processing blocks discussed herein and illustrated in the Figures may be implemented in hardware, firmware, software or any combination thereof. Further, the phraseology or terminology employed herein is for the purpose of description and not of limitation.

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

What is claimed is:

1. A method for performing capacitive touch sensing and proximity detection, the method comprising the steps of:
storing an individual electrode baseline value for each individual electrode of a plurality of individual electrodes;
storing one proximity electrode baseline value for a proximity electrode that comprises multiples ones of the plurality of individual electrodes;
establishing a first connection with an individual electrode of the plurality of individual electrodes in order to receive one or more first signals indicating a state of the individual electrode;
performing a first analysis of the one or more first signals to determine whether to perform a first updating process for the individual electrode baseline value previously stored for the individual electrode;
establishing simultaneous second connections with the multiple ones of the plurality of individual electrodes that form the proximity electrode in order to receive one or more second signals indicating a state of the proximity electrode; and
performing a second analysis of the one or more second signals to determine whether to perform a second updating process for the proximity electrode baseline value previously stored for the proximity electrode, wherein the first analysis and the second analysis are different from each other.

2. The method of claim 1, wherein the first analysis includes a first filtering process, and the second analysis includes a second filtering process, the method further comprising:
prior to performing the first analysis, storing first filtering parameters that constrain the first filtering process; and
prior to performing the second analysis, storing second filtering parameters that constrain the second filtering process, wherein the first filtering parameters are different from the second filtering parameters.

3. The method of claim 2, wherein:
storing the first filtering parameters comprises storing a first filter delay limit value that specifies a number of the one or more first signals that will be used to determine a first comparison value for use in the first filtering process; and
storing the second filtering parameters comprises storing a second filter delay limit value that specifies a number of the one or more second signals that will be used to determine a second comparison value for use in the second filtering process, wherein the first filter delay limit value and the second filter delay limit value are different from each other.

4. The method of claim 2, wherein:
storing the first filtering parameters comprises storing a first maximum half delta value that specifies a largest difference between a first comparison value and the individual electrode baseline value that classifies the first comparison value as non-noise; and
storing the second filtering parameters comprises storing a second maximum half delta value that specifies a largest difference between a second comparison value and the proximity electrode baseline value that classifies the second comparison value as non-noise, wherein the first maximum half delta value and the second maximum half delta value are different from each other.

5. The method of claim 4, wherein:
storing the first filtering parameters comprises storing a first noise count limit value that specifies a number of consecutive first comparison values that have a difference with the individual electrode baseline value that is greater than the first maximum half delta value before a determination of non-noise drift is made; and
storing the second filtering parameters comprises storing a second noise count limit value that specifies a number of consecutive second comparison values that have a difference with the proximity electrode baseline value that is greater than the second maximum half delta value before a determination of non-noise drift is made, wherein the first noise count limit value and the second noise count limit value are different from each other.

6. The method of claim 2, wherein:
storing the first filtering parameters comprises storing a first noise half delta value that specifies a magnitude by which the individual electrode baseline value is to be adjusted when performing the first updating process; and
storing the second filtering parameters comprises storing a second noise half delta value that specifies a magnitude by which the proximity electrode baseline value is to be adjusted when performing the second updating process, wherein the first noise half delta value and the second noise half delta value are different from each other.

7. The method of claim 1, further comprising:
performing an individual electrode charging process by charging the individual electrode according to first charging parameters;
determining a first voltage value for the individual electrode, which results from the individual electrode charging process;
determining whether the first voltage value meets a first criterion;
when the state of the individual electrode is a no-touch state and when the first voltage value meets the first criterion, transitioning the state of the individual electrode to a touch state;
performing a proximity electrode charging process by charging the proximity electrode according to second charging parameters;
determining a second voltage value for the proximity electrode, which results from the proximity electrode charging process;
determining whether the second voltage value meets a second criterion; and
when the state of the proximity electrode is a non-proximal state and when the second voltage value meets the second criterion, transitioning the state of the proximity electrode to a proximal state.

8. The method of claim 7, further comprising:
determining whether the first voltage value meets a third criterion;
when the state of the individual electrode is a touch state and when the first voltage value meets the third criterion, transitioning the state of the individual electrode to a no-touch state;
determining whether the second voltage value meets a fourth criterion; and
when the state of the proximity electrode is a proximal state and when the second voltage value meets the fourth criterion, transitioning the state of the proximity electrode to a non-proximal state.

9. The method of claim 7, wherein:
the first charging parameters include a first charging current; and
the second charging parameters include a second charging current that is different from the first charging current.

10. The method of claim 7, wherein:
the first charging parameters include a first charging interval; and
the second charging parameters include a second charging interval that is different from the first charging interval.

11. The method of claim 1, wherein the multiple ones of the plurality of individual electrodes comprising the proximity electrode are in a close proximity to each other.

12. The method of claim 1, further comprising:
determining whether the proximity electrode is enabled or disabled; and
when the proximity electrode is disabled, bypassing the steps of establishing the second connections and performing the second analysis.

13. The method of claim 1, wherein the first analysis includes a first filtering process, and the second analysis includes a second filtering process, and wherein:
the first filtering process has a first frequency response; and
the second filtering process has a second frequency response that is different from the first frequency response.

14. A method for performing capacitive touch sensing and proximity detection, the method comprising the steps of:
storing an individual electrode baseline value for each individual electrode of a plurality of individual electrodes;
storing one proximity electrode baseline value for a proximity electrode that comprises multiples ones of the plurality of individual electrodes;
storing first charging parameters and first analysis parameters associated with performing first charging and sensing processes for an individual electrode of the plurality of individual electrodes;
storing second charging parameters and second analysis parameters associated with performing second charging and sensing processes for the proximity electrode, wherein the first charging and sensing operations are configured differently from the second charging and sensing operations;
establishing a first connection with the individual electrode;
charging the individual electrode in accordance with the first charging parameters;
receiving a first signal indicating a state of the individual electrode;
determining, based on the first signal, whether to perform a first updating process for the individual electrode baseline value previously stored for the individual electrode by performing a first analysis that is constrained by the first analysis parameters;
establishing simultaneous second connections with the multiple ones of the plurality of individual electrodes that form the proximity electrode;
charging the proximity electrode in accordance with the second charging parameters;
receiving a second signal indicating a state of the proximity electrode; and
determining, based on the second signal, whether to perform a second updating process for proximity electrode baseline value previously stored for the proximity electrode by performing a second analysis that is constrained by the second analysis parameters.

15. The method of claim 14, wherein the first charging parameters are different from the second charging parameters.

16. The method of claim 14, wherein the first analysis parameters are different from the second analysis parameters.

17. The method of claim 14, further comprising:
determining whether the proximity electrode is enabled or disabled; and
when the proximity electrode is disabled, bypassing the steps of establishing the second connections, charging the proximity electrode, receiving the second signal, and determining whether to perform the second updating process.

18. A capacitive touch and proximity sensor system comprising:
data storage for storing an individual electrode baseline value for each individual electrode of a plurality of individual electrodes, and for storing one proximity electrode baseline value for a proximity electrode that comprises multiples ones of the plurality of individual electrodes;
electrode selection circuitry configured to establish a first connection with an individual electrode of the plurality of individual electrodes in order to receive one or more first signals indicating a state of the individual electrode, and to establish second connections with a proximity electrode that comprises multiple ones of the plurality of individual electrodes in order to receive one or more second signals indicating a state of the proximity electrode; and
a processing system, operatively coupled with the electrode selection circuitry, and configured to perform a first analysis of the one or more first signals to determine whether to perform a first updating process for the individual electrode baseline value previously stored for the individual electrode, and to perform a second analysis of the one or more second signals to determine whether to perform a second updating process for the proximity electrode baseline value previously stored for the proximity electrode, wherein the first analysis and the second analysis are different from each other.

19. The capacitive touch and proximity sensor system of claim 18, wherein the electrode selection circuitry comprises:
a multiplexer configured to establish the first connection in response to a first control signal from the processing system, and to establish the second connections in response to a second control signal from the processing system.

20. The capacitive touch and proximity sensor system of claim 18, further comprising:
a current source, operatively coupled to the processing system and to the electrode selection circuitry, and configured to supply a first charging current to the individual electrode and to supply a second charging current to the proximity electrode, wherein the first charging current and the second charging current are different from each other.

* * * * *